United States Patent
Kim et al.

(10) Patent No.: US 9,344,240 B2
(45) Date of Patent: May 17, 2016

(54) 256QAM SIGNAL TRANSMISSION/RECEPTION METHOD AND APPARATUS FOR USE IN MOBILE COMMUNICATION SYSTEM

(71) Applicant: Samsung Electronics Co., Ltd., Suwon-si, Gyeonggi-do (KR)

(72) Inventors: Younsun Kim, Seongnam-si (KR); Jinyoung Oh, Seoul (KR); Hyojin Lee, Suwon-si (KR); Yongjun Kwak, Yongin-si (KR); Hyoungju Ji, Seoul (KR); Youngbum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 14/245,423

(22) Filed: Apr. 4, 2014

(65) Prior Publication Data
US 2014/0301306 A1    Oct. 9, 2014

(30) Foreign Application Priority Data

Apr. 4, 2013    (KR) .................. 10-2013-0036996
Jun. 19, 2013    (KR) .................. 10-2013-0070569

(51) Int. Cl.
*H04L 5/00* (2006.01)

(52) U.S. Cl.
CPC .............. *H04L 5/0046* (2013.01); *H04L 5/006* (2013.01); *H04L 5/0057* (2013.01); *H04L 5/0023* (2013.01); *H04L 5/0048* (2013.01); *H04L 5/0055* (2013.01); *H04L 5/0073* (2013.01)

(58) Field of Classification Search
CPC .................................................... H04L 5/0046
See application file for complete search history.

(56) References Cited

U.S. PATENT DOCUMENTS

| | | | | |
|---|---|---|---|---|
| 2002/0072334 | A1* | 6/2002 | Dunne | H04B 17/18 455/67.11 |
| 2008/0285512 | A1 | 11/2008 | Pan et al. | |
| 2009/0154588 | A1* | 6/2009 | Chen | H04L 1/0026 375/267 |
| 2009/0245408 | A1 | 10/2009 | Mujtaba et al. | |
| 2012/0008546 | A1* | 1/2012 | Yokoyama | H04B 7/15542 370/315 |
| 2012/0087438 | A1 | 4/2012 | Futagi et al. | |
| 2013/0058307 | A1 | 3/2013 | Kim et al. | |
| 2013/0235809 | A1* | 9/2013 | Li | H04W 72/042 370/329 |
| 2013/0343255 | A1* | 12/2013 | Han | H04L 1/0009 370/312 |
| 2015/0036590 | A1* | 2/2015 | Lahetkangas | H04L 1/0003 370/328 |

OTHER PUBLICATIONS

ZTE, 'Consideration on high order modulation for small cell', R1-130136, 3GPP TSG-RAN WG1 Meeting #72, Jan. 28, 2013.

* cited by examiner

*Primary Examiner* — Gerald Smarth
(74) *Attorney, Agent, or Firm* — Jefferson IP Law, LLP

(57) ABSTRACT

A method and an apparatus for transmitting and receiving signals modulated with 256 Quadrature Amplitude Modulation (256QAM) for use in a mobile communication system are provided. The method includes receiving a first signal from a terminal, determining a modulation application criterion for data communication with the terminal based on the first signal, receiving a second signal including an index from the terminal, and determining a modulation scheme to be applied to at least one of the signals communicating with the terminal based on the modulation application criterion and the received index.

20 Claims, 23 Drawing Sheets

256QAM SIGNAL TRANSMISSION/RECEPTION METHOD AND APPARATUS FOR USE IN MOBILE COMMUNICATION SYSTEM

CROSS-REFERENCE TO RELATED APPLICATION(S)

This application claims the benefit under 35 U.S.C. §119 (a) of a Korean patent application filed on Apr. 4, 2013 in the Korean Intellectual Property Office and assigned Serial number 10-2013-0036996, and of a Korean patent application filed on Jun. 19, 2013 in the Korean Intellectual Property Office and assigned Serial number 10-2013-0070569, the entire disclosure of each of which is hereby incorporated by reference.

TECHNICAL FIELD

The present disclosure relates to a method and apparatus for transmitting and receiving signals modulated with 256 Quadrature Amplitude Modulation (256QAM) in a mobile communication system.

BACKGROUND

The mobile communication system has evolved into a high-speed, high-quality wireless packet data communication system to provide various data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in 3GPP-2 (3GPP2), and standard 802.16 of the Institute of Electrical and Electronics Engineers (IEEE), have been developed to support the high-speed, high-quality wireless packet data communication services. More particularly, LTE is a communication standard developed to support high speed packet data transmission and to maximize the throughput of the radio communication system with various radio access technologies. LTE-A is an evolved version of LTE to improve the data transmission capability.

Typically, LTE base stations and terminals are typically based on 3GPP Release 8 or Release 9, while LTE-A base stations and terminals are typically based on 3GPP Release 10. The 3GPP standard organization is preparing the next release for more improved performance beyond LTE-A.

A method proposed recently for use in mobile communication is characterized in that the terminal measures interference and reports the measurement result to the base station, such that the base station determines the signal to be transmitted to the terminal based on the channel condition derived from the measurement report. The existing $3^{rd}$ and $4^{th}$ generation wireless packet data communication systems (such as HSDPA, HSUPA, HRPD, and LTE/LTE-A) adopt Adaptive Modulation and Coding (AMC) and Channel-Sensitive Scheduling (CSS) techniques to improve the transmission efficiency. AMC allows the transmitter to adjust the data amount to be transmitted according to the channel condition. That is, the transmitter is capable of decreasing the data transmission amount for a bad channel condition so as to fix the received signal error probability at a certain level, or increasing the data transmission amount for a good channel condition so as to transmit a large amount of information efficiently while maintaining the received signal error probability at an intended level. The CSS allows the transmitter to serve the user having good channel condition selectively among a plurality of users so as to increase the system capacity as compared to allocating a channel fixedly to serve a single user. This increase in system capacity is referred to as multi-user diversity gain. Both the AMC and CSS are methods of adopting the best modulation and coding scheme at the most efficient time based on the partial channel status information feedback from the receiver. There is a need of a method for transmitting large amount of data at a high data rate based on the AMC and CSS.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a 256QAM-supporting Channel Quality Indication (CQI) transmission/reception method and a method for transmitting/receiving Modulation and Coding Scheme (MCS) in the scheduling control information in a mobile communication system based on LTE-A.

In accordance with an aspect of the present disclosure, a signal transmission/reception method of a base station in a mobile communication system is provided. The signal transmission/reception method includes receiving a first signal from a terminal, determining a modulation application criterion for data communication with the terminal based on the first signal, receiving a second signal including an index from the terminal, and determining a modulation scheme to be applied to at least one of the signals communicating with the terminal based on the modulation application criterion and the received index.

In accordance with another aspect of the present disclosure, a signal transmission/reception method of a terminal in a mobile communication system is provided. The signal transmission/reception method includes transmitting a first signal to a base station and transmitting a second signal including an index to the base station, wherein the base station determines a modulation application criterion for data communication with the terminal based on the first signal and selects a modulation scheme to be applied to at least one of the signals communicating with the terminal based on the modulation application criterion and the received index.

In accordance with another aspect of the present disclosure, a base station of a mobile communication system is provided. The base station includes a transceiver which transmits and receives signals to and from a terminal and a controller which controls the transceiver to receive a first signal from the terminal, determines a modulation application criterion for data communication with the terminal based on the first signal, controls the transceiver to receive a second signal including an index from the terminal, and determines a modulation scheme to be applied to at least one of the signals communicating with the terminal based on the modulation application criterion and the received index.

In accordance with still another aspect of the present disclosure, a terminal of a mobile communication system is provided. The terminal includes a transceiver which transmits and receives signals to and from a base station and a controller which controls the transceiver to transmit a first signal to a base station and transmit a second signal including an index to the base station, wherein the base station determines a modulation application criterion for data communication with the terminal based on the first signal and selects a modulation scheme to be applied to at least one of the signals communicating with the terminal based on the modulation application criterion and the received index.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
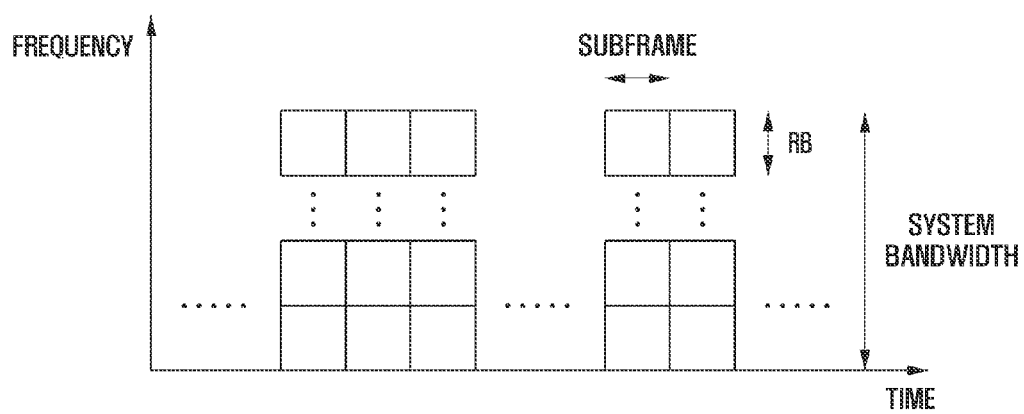
FIG. 1 is a graph illustrating time-frequency resources in Long Term Evolution (LTE)/LTE-Advanced (LTE/LTE-A) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the Orthogonal Frequency Division Multiplexing (OFDM)-based radio communication system, particularly the $3^{rd}$ Generation Partnership Project (3GPP) Evolved Universal Mobile Telecommunication System (UMTS) Terrestrial Radio (EUTRA), it will be understood by those skilled in the art that the present disclosure can be applied even to other communication systems having the similar technical background and channel format, with a slight modification, without departing from the spirit and scope of the present disclosure.

The present disclosure provides a method for supporting 256 Quadrature Amplitude Modulation (256QAM) capable of transmitting 8-bit information with one modulation symbol efficiently in a Long Term Evolution (LTE) mobile communication system.

In case of using Adaptive Modulation and Coding (AMC) along with Multiple Input Multiple Output (MIMO) transmission scheme, it may be necessary to take a number of spatial layers and ranks for transmitting signals in to consideration. In this case, the transmitter determines the optimal data rate in consideration of the number of layers for use in MIMO transmission as well as coding rate and modulation scheme.

Recently, research is being conducted to replace Code Division Multiple Access (CDMA) used in the legacy $2^{nd}$ and $3^{rd}$ mobile communication systems with Orthogonal Frequency Division Multiple Access (OFDMA) for the next generation mobile communication system. The 3GPP and 3GPP2 are in the middle of the standardization of OFDMA-based evolved system. OFDMA is expected to provide superior system throughput as compared to the CDMA. One of the main factors that allows OFDMA to increase system throughput compared to the previous technology is the frequency domain scheduling capability. As channel sensitive scheduling increases the system capacity using the time-varying channel characteristic, OFDM can be used to obtain more capacity gain using the frequency-varying channel characteristic.

FIG. 1 is a graph illustrating time-frequency resources in an LTE/LTE-Advanced (LTE-A) system according to an embodiment of the present disclosure.

As shown in FIG. 1, the radio resource for transmission from the evolved Node B (eNB) to a User Equipment (UE) is divided into Resource Blocks (RBs) in the frequency domain and subframes in the time domain. In the LTE/LTE-A system, an RB consists of 12 consecutive carriers and has a bandwidth of 180 kHz in general. A subframe consists of 14 OFDM symbols and spans 1 millisecond (msec). The LTE/LTE-A system allocates resources for scheduling in units of subframes in the time domain and in units of RB in the frequency domain.

Figure 2:
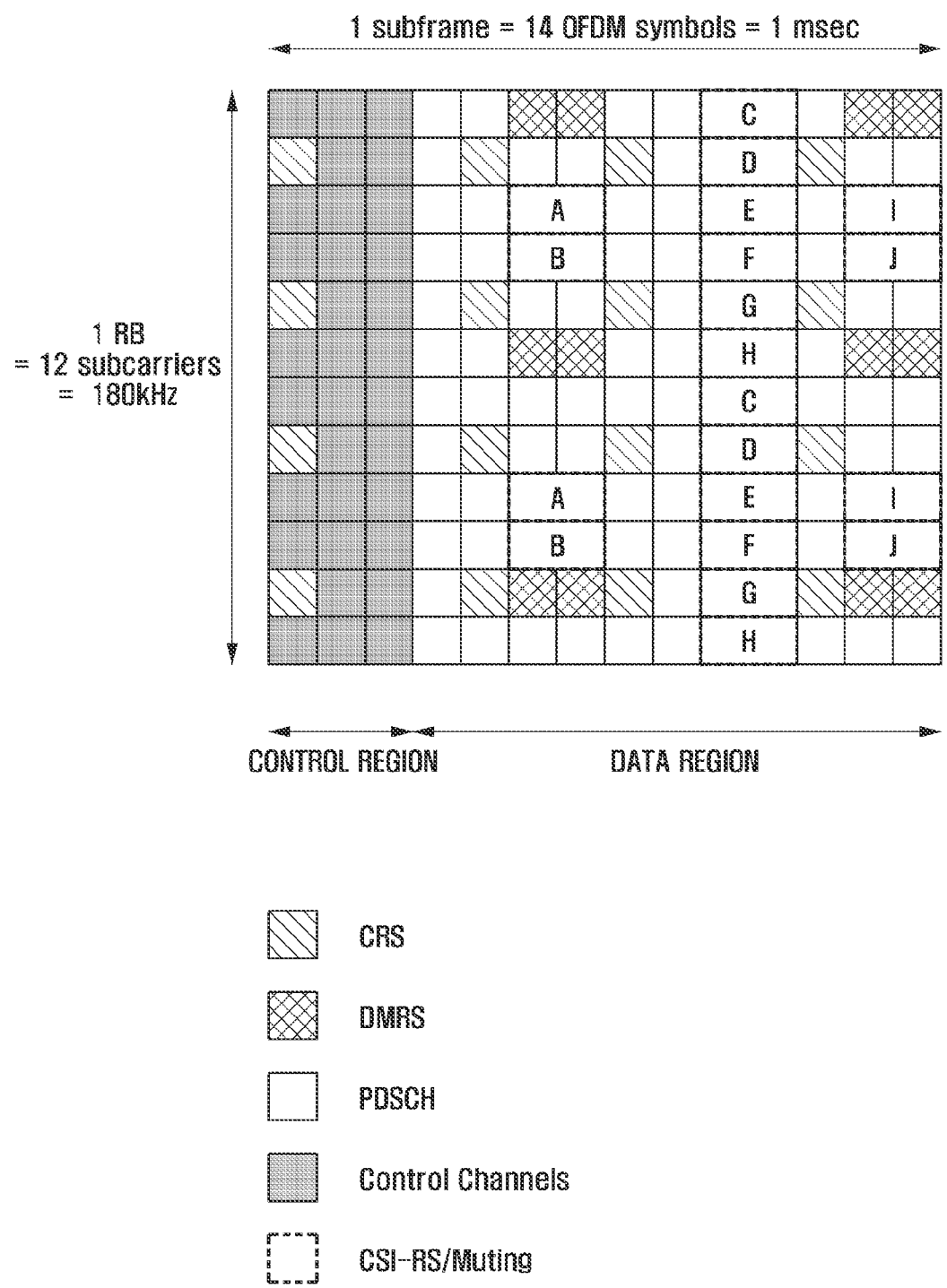
FIG. 2 is a time-frequency grid illustrating a single resource block of a downlink subframe as a smallest scheduling unit in the LTE/LTE-A system according to an embodiment of the present disclosure.

FIG. 2 is a time-frequency grid illustrating a single resource block of a downlink subframe as a smallest scheduling unit in the LTE/LTE-A system according to an embodiment of the present disclosure.

The radio resource depicted in FIG. 2 is of one subframe in the time domain and one RB in the frequency domain. The radio resource consists of 12 subcarriers in the frequency domain and 14 OFDM symbols in the time domain, i.e. 168 unique frequency-time positions. In FIG. 2, the tenth and eleventh symbols in the time domain are depicted together in a single column. In LTE/LTE-A, each frequency-time position is referred to as Resource Element (RE). One subframe consists of two slots, and each slot consists of 7 OFDM symbols.

The radio resource structured as shown in FIG. 2 can be configured to transmit different types of signals as follows.

1. Cell-specific Reference Signal (CRS): a reference signal transmitted to all the UEs within a cell
2. Demodulation Reference Signal (DMRS): a reference signal transmitted to a specific UE 3. Physical Downlink Shared Channel (PDSCH): a data channel transmitted in downlink which the eNB use to transmit data to the UE and mapped to REs not used for reference signal transmission in data region of FIG. 2

4. Channel Status Information Reference Signal (CSI-RS): a reference signal transmitted to the UEs within a cell and used for channel state measurement. Multiple CSI-RSs can be transmitted within a cell.

5. Other control channels (Physical Hybrid-Automatic Repeat Request (HARQ) Indicator Channel (PHICH), Physical Control Format Indicator Channel (PCFICH), Physical Downlink Control Channel (PDCCH)): channels for providing control channel necessary for the UE to receive PDCCH and transmitting ACKnowledgement/Non-ACKnowledgement (ACK/NACK) of HARQ operation for uplink data transmission.

In addition to the above signals, zero power CSI-RS may be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal on the resource excluding the zero power CSI-RS positions in general. In the LTE-A system, the zero power CSI-RS is referred to as 'muting.' The muting by nature is mapped to the CSI-RS positions having transmission power allocation.

Referring to FIG. 2, the CSI-RS can be transmitted at some of the positions marked by A, B, C, D, E, F, G, H, I, and J according to a number of antennas transmitting the CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, the entirety of the specific pattern is used for CSI-RS transmission; and for eight antenna ports, two patterns are used for CSI-RS transmission. Muting is always performed by pattern. That is, although the muting may be applied to plural patterns, if the muting positions mismatch CSI-RS positions, the muting cannot be applied to one pattern partially. However, if the CSI-RS positions match the zero power CSI-RS (muting) positions, the muting can be applied to part of one pattern.

In a cellular system, the reference signal must be transmitted for downlink channel state measurement. In the case of the 3GPP LTE-A system, the UE measures the channel state based on the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE has to determine an energy per symbol (Es) that can be received in downlink and an interference amount (Io) that may be received for the duration of receiving the corresponding symbol to calculate Es/Io from the received reference signal. The calculated Es/Io is reported to the eNB such that the eNB determines the downlink data rate for the UE.

Figure 3:
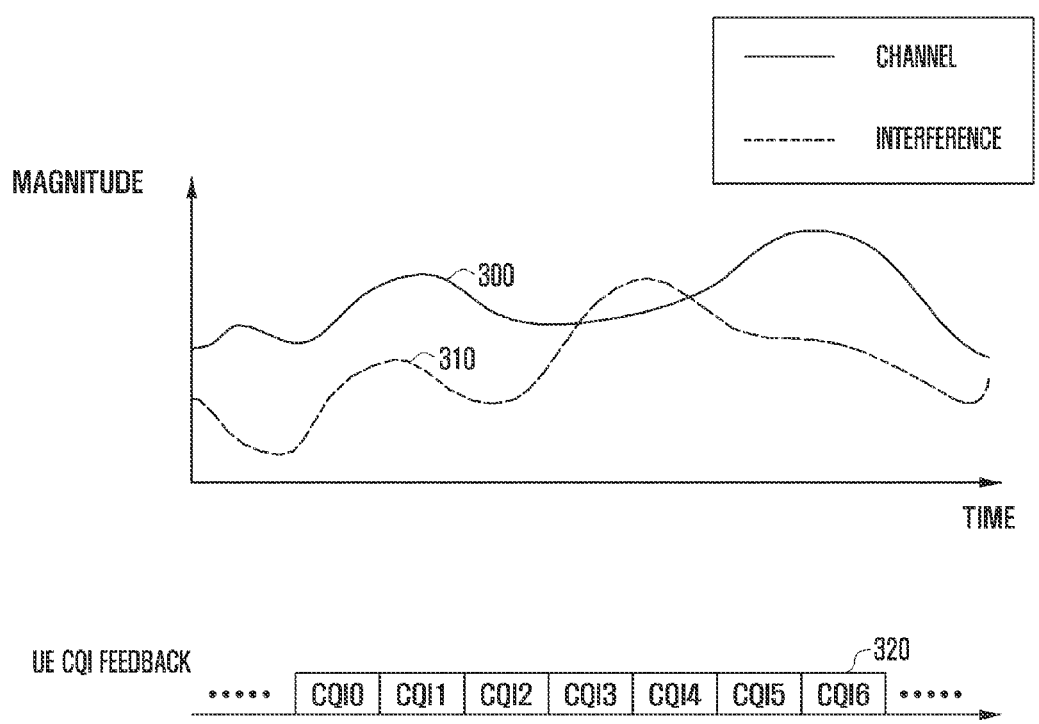
FIG. 3 is a diagram illustrating change of Channel Quality Indicator (CQI) as one of channel status informations transmitted by the User Equipment (UE) according to measured signal energy and interference strengths according to an embodiment of the present disclosure.

FIG. 3 is a diagram illustrating a change of Channel Quality Indicator (CQI) as one channel status information transmitted by the UE according to measured signal energy and interference strengths according to an embodiment of the present disclosure.

Referring to FIG. 3, the UE measures the downlink reference signal such as CSI-RS for channel estimation and calculates the received signal energy (Es) according to the radio channel 300 based on the channel estimation. The UE also calculates the strength of interference and noise as denoted by reference number 310 using an extra resource allocated for a downlink reference signal or interference and noise measurement. In LTE, CRS is used as the downlink reference signal for interference and noise measurement, or the eNB may configure an Interference Measurement Resource (IMR) to the UE such that the UE assumes that the signal measured on the IMR is interference and noise. Using the received signal energy and interference and noise strengths acquired in this method, the UE determines the maximum available data rate supportable for a regular probability of success at the calculated signal to interference plus noise ratio (SINR) and reports the maximum available data rate. The eNB determines the actual data rage for downlink data transmission to the UE based on the maximum data rate reported by the UE. The maximum data rate available at the certain probability of success is indicated by CQI in LTE standard. Typically, since the radio channel varies over time, the UE reports CQI to the eNB periodically or in response to a request from the eNB. The eNB may request the UE for CQI report periodically or non-periodically.

Figure 4:
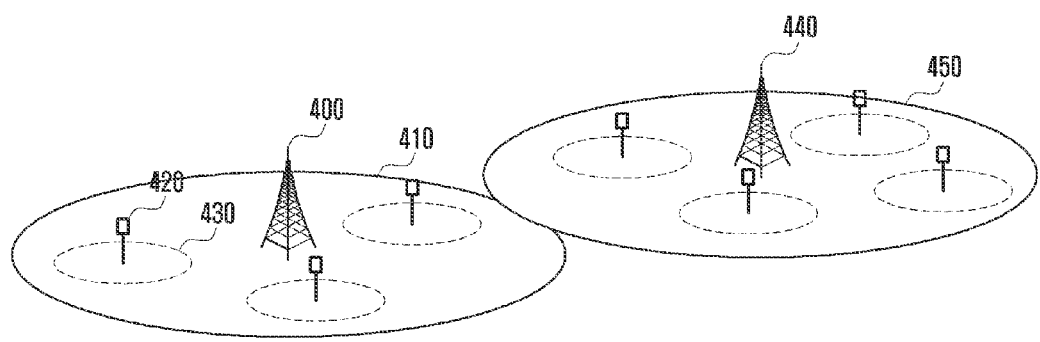
FIG. 4 is a diagram illustrating a multi-cell mobile communication system comprised of a plurality cells according to an embodiment of the present disclosure.

FIG. 4 is a diagram illustrating a multi-cell mobile communication system comprised of a plurality cells according to an embodiment of the present disclosure.

Referring to FIG. 4, the multi-cell mobile communication system may be comprised of macro cells operating with high transmission power and small cells operating with low transmission power. At this time, the service area or coverage area of each cell is defined by the transmission power of the corresponding cell. For example, the coverage area 410 of the transmitter 400 operating with high transmission power is large in size, but the coverage area 430 of the transmitter 420 operating with low transmission power is small in size. Similarly, the coverage area 450 of the transmitter 440 operating with high transmission power is also large in size. In FIG. 4, the macro and small cells coexisting in a restricted area may interfere with each other as depicted where the coverage areas 410 and 450 overlap, resulting in performance degradation. The small cells according to an embodiment of the present disclosure include the cell having a different cell identification (ID) in a multi-cell system and a Remote Radio Head (RRH) having the same Cell ID as the macro cell and distributed in the coverage area of the macro cell.

In the mobile communication system, the macro and small cells are used for different purposes. By taking notice that the macro cell has a large coverage area, the macro cell is used for mobility management and correcting coverage holes. In contrast, the small cell is deployed in the high-demand density area for supporting high data rate transmission within the restricted area. Particularly, the small cell is likely to be deployed in an indoor area and this means that the macro cell signal is blocked effectively such that the UE experiences a very high signal-to-interference plus noise ratio.

As described above, the recent mobile communication system such as LTE improves the system throughput by adopting AMC which determines the data rate in adaptation to the channel state. The AMC selects the highest data rate available for the UE to receive signals while maintaining a predetermined successful signal reception rate by taking notice of the channel condition of the UE among a plurality of data transmission rates defined based on the modulation scheme and data amount. Table 1 summarizes Modulation and Coding Scheme (MCS) levels for downlink data transmission on 6-RB bandwidth in AMC of LTE. In more detail, Table 1 shows the MCS levels for downlink data transmission on 6-RB bandwidth.

TABLE 1

| MCS Index: $I_{MCS}$ | Modulation Order: $Q_m$ | TBS Index: $I_{TBS}$ | TBS Size | Spectral Efficiency (bps/Hz) |
|---|---|---|---|---|
| 0 | 2 | 0 | 152 | 0.140741 |
| 1 | 2 | 1 | 208 | 0.192593 |
| 2 | 2 | 2 | 256 | 0.237037 |
| 3 | 2 | 3 | 328 | 0.303704 |
| 4 | 2 | 4 | 408 | 0.377778 |
| 5 | 2 | 5 | 504 | 0.466667 |
| 6 | 2 | 6 | 600 | 0.555556 |
| 7 | 2 | 7 | 712 | 0.659259 |
| 8 | 2 | 8 | 808 | 0.748148 |
| 9 | 2 | 9 | 936 | 0.866667 |
| 10 | 4 | 9 | 936 | 0.866667 |
| 11 | 4 | 10 | 1032 | 0.955556 |
| 12 | 4 | 11 | 1192 | 1.103704 |
| 13 | 4 | 12 | 1352 | 1.251852 |
| 14 | 4 | 13 | 1544 | 1.42963 |
| 15 | 4 | 14 | 1736 | 1.607407 |
| 16 | 4 | 15 | 1800 | 1.666667 |
| 17 | 6 | 15 | 1800 | 1.666667 |
| 18 | 6 | 16 | 1928 | 1.785185 |
| 19 | 6 | 17 | 2152 | 1.992593 |
| 20 | 6 | 18 | 2344 | 2.17037 |
| 21 | 6 | 19 | 2600 | 2.407407 |
| 22 | 6 | 20 | 2792 | 2.585185 |
| 23 | 6 | 21 | 2984 | 2.762963 |
| 24 | 6 | 22 | 3240 | 3 |
| 25 | 6 | 23 | 3496 | 3.237037 |
| 26 | 6 | 24 | 3624 | 3.355556 |
| 27 | 6 | 25 | 3752 | 3.474074 |
| 28 | 6 | 26 | 4392 | 4.066667 |
| 29 | 2 | reserved | | |
| 30 | 4 | | | |
| 31 | 6 | | | |

In Table 1, a total of 29 MCS levels are defined, and each MCS index is defined with a modulation order and a transport block size. The transport block size corresponds to the size of the transmitted information amount and is expressed in units of bits. That is, in Table 1, MCS index 28 means that total 4392 bits are transmitted on the 6-RB bandwidth (180 kHz×6=1080 kHz). The modulation order denotes a number of bits mapped to one modulation symbol when a certain modulation scheme is applied. The LTE (Release 11 and earlier) standard supports modulation orders 2, 4, and 6 as shown in Table 1.

Figure 5:
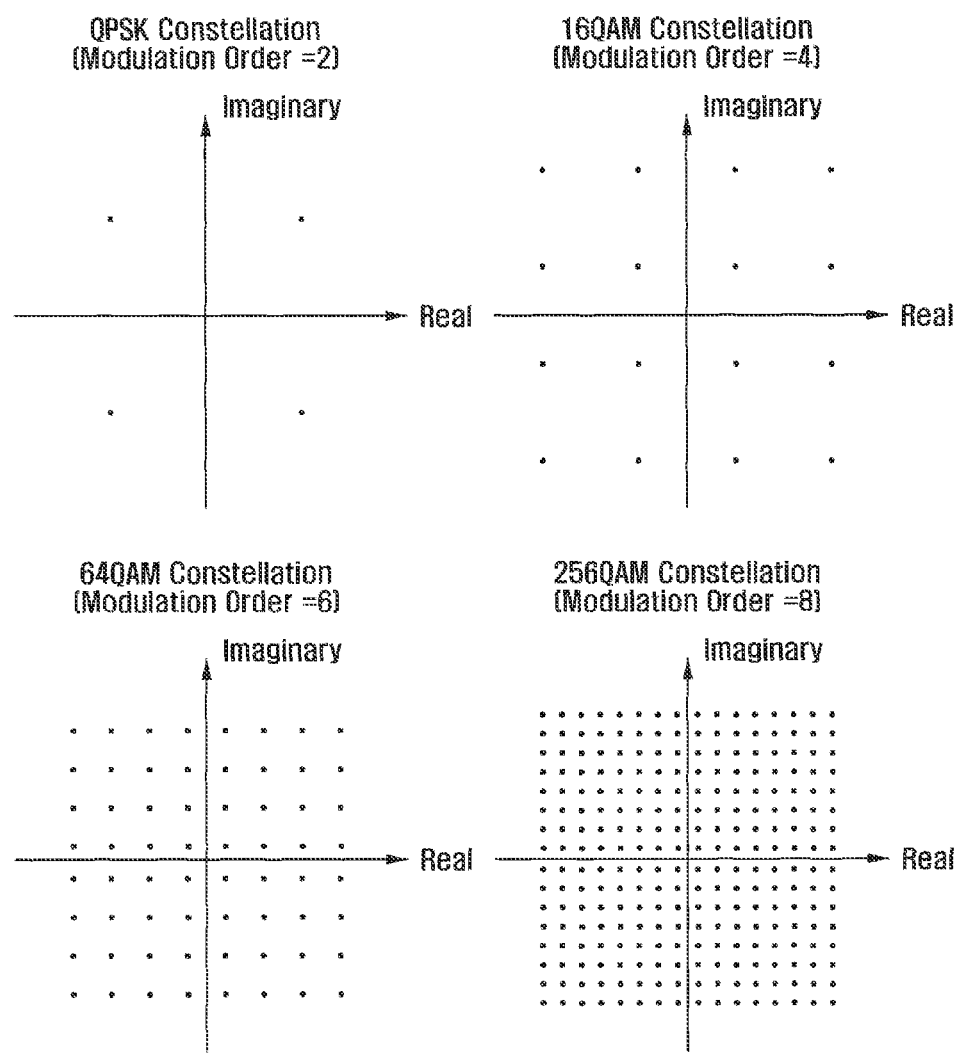
FIG. 5 is a diagram illustrating constellations of Quadrature Amplitude Modulation (QAM) symbols for use in an embodiment of the present disclosure according to an embodiment of the present disclosure.

FIG. 5 is a diagram illustrating constellations of QAM symbols for use according to an embodiment of the present disclosure.

In LTE, 256QAM may be used in addition to the modulation orders of 2, 4, and 6 as shown in FIG. 5. The use of 256QAM results in the following advantages.

It is possible to implement a higher data rate using a higher modulation order.

It is possible to optimize a transmission/reception at the received signal energy-to-noise plus interference ratio in a broader range using the higher modulation orders.

In LTE Release 11 and earlier, the data transmission is performed with Quadrature Phase Shift Keying (QPSK), 16QAM, and 64QAM for the modulation orders 2, 4, and 6 as shown in FIG. 5. The higher the modulation order is, the more data is transmitted and, disadvantageously, the higher the signal energy-to-noise plus interference ratio is required. As shown in FIG. 5, the 256QAM is capable of support a reception performance high enough at a very high received signal energy-to-noise plus interference ratio. In order to fulfil the received signal energy-to-noise plus interference ratio, the complexity of the receiver of the UE increases disadvantageously. The Analog to Digital Converter (ADC) of the UE generates noise in association with a number of quantization bits and, in order to suppress the noise, it is required to increase the number of quantization bits, resulting in an increase of extra complexity and of a power consumption of the UE.

Supporting more modulation orders means supporting the broader range of the received signal energy-to-noise plus interference ratio and thus improves the system performance. As compared to the system supporting only the modulation orders 2 and 4, the system supporting the modulations orders 2, 4, and 6 is capable of supporting the broader range of the received SINR, resulting in a performance improvement effect. In the LTE system, supporting more modulation orders causes two problems as follows.

An increase of channel status information reported from the UE to the eNB; and an increase of information of a control channel through which the eNB notifies the UE of downlink transmission.

Figure 6:
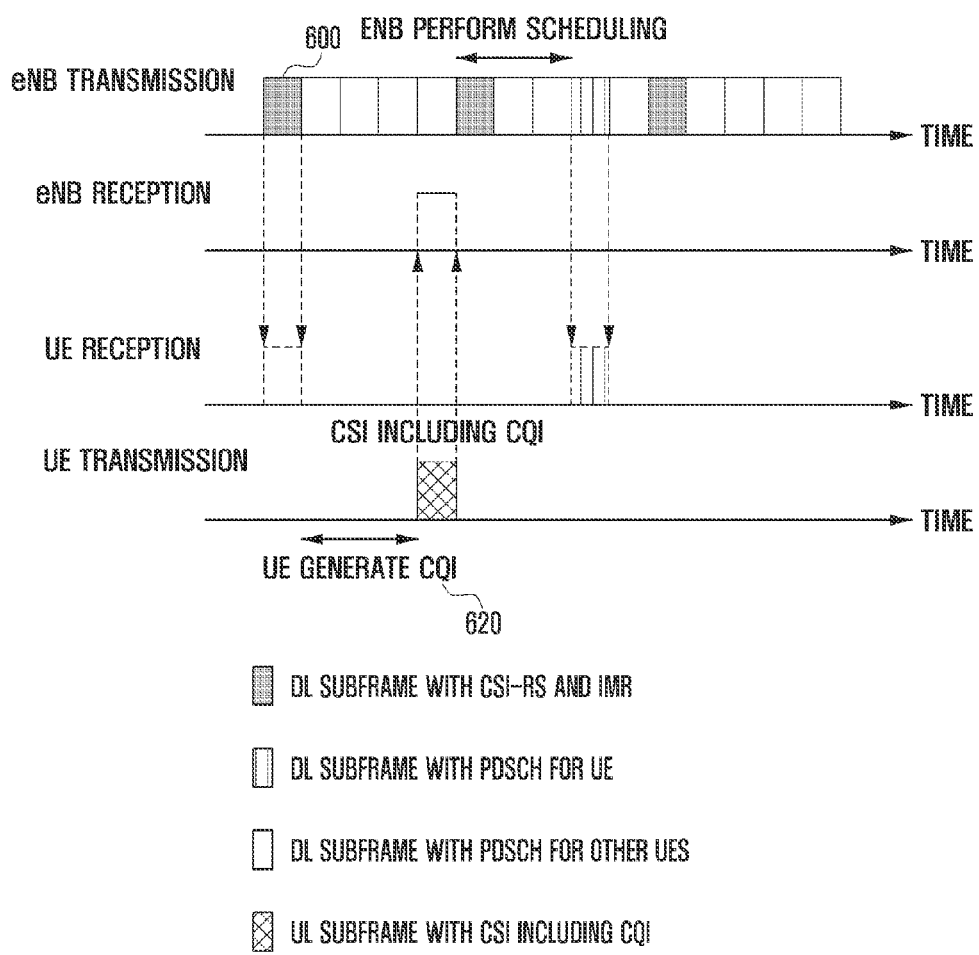
FIG. 6 is a diagram illustrating transmission timings in Adaptive Modulation and Coding (AMC) between the UE and ten evolved Node B (eNB) according to an embodiment of the present disclosure.

FIG. 6 is a diagram illustrating transmission timings in AMC between the UE and ten eNB according to an embodiment of the present disclosure.

A description is made of the AMC between the UE and the eNB to assist in understanding the above problems with reference to FIG. 6. The UE receives CSI-RS as the downlink reference signal transmitted by the eNB and the Interference Measurement Resource (IMR) as the radio resource for use in interference measurement and generates the channel status information based on information as denoted by reference number 620. The channel status information generated by the UE includes CQI which indicates maximum data rate available for the UE. In the LTE Release 11 system, the CQI is composed of 4 bits and defined as shown in Table 2. Table 2 lists the entries for CQI indices, modulation, code rate, and efficiency defined in LTE Release 11 and earlier.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The CQI defined in LTE Release 11 and earlier as shown in Table 1 supports the modulation formats up to 64QAM but not 256QAM. That is, in the case of using Table 2, although it can support the modulation formats up to 256QAM and the channel condition is good enough to decode the 256QAM signal with the required reception performance, there is no way in LTE Release 11 of notifying the eNB of this.

Another reason why the LTE Release 11 cannot support 256QAM is because the control information transmitted from the eNB to the UE through PDCCH/Enhanced PDCCH (PDCCH/E-PDCCH) as the control channel containing the scheduling information on the PDSCH as the data channel has no function of designating 256QAM. The UE decodes PDCCH/E-PDCCH to acquire the control information contained therein to determine whether the PDSCH is addressed to it and the modulation applied to the PDSCH. A problem exists in that the control information defined in Release 11 has no function of notifying of 256QAM. Table 1 summarizes the modulation order of PDSCH and the number of information bits defined in LTE/LTE-A Release 11. The eNB sends the UE the modulation index value to notify the UE of the modulation order of PDSCH and the number of information bits. Here, there is no MCS index designating 256QAM.

As described above, in order to support 256QAM in downlink of the LTE/LTE-A system, it is necessary to define CQI newly. The CQI for supporting 256QAM is provided as follows.

New CQI definition method 1: To broaden the range of spectral efficiency designated by 4 bits of CQI.

New CQI definition method 2: To extend the CQI information amount from 4 bits to 5 bits to support 256QAM New CQI definition method 3: To apply the scope of the spectral efficiency indicated by CQI variably to support 256QAM.

The CQI definition method 1 provided by the present disclosure makes it possible for the CQI to designate up to 256QAM using 4 bits like the conventional CQI. As a consequence, this method designates the less dense spectral efficiency to designate 256QAM as compared to the conventional CQI definition method, resulting in less accuracy of channel status information. Table 3 shows a CQI table defined newly by applying the CQI definition method 1.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 308 | 0.6016 |
| 4 | QPSK | 449 | 0.8770 |
| 5 | QPSK | 602 | 1.1758 |
| 6 | 16QAM | 378 | 1.4766 |
| 7 | 16QAM | 490 | 1.9141 |
| 8 | 16QAM | 616 | 2.4063 |
| 9 | 64QAM | 466 | 2.7305 |
| 10 | 64QAM | 666 | 3.9023 |
| 11 | 64QAM | 772 | 4.5234 |
| 12 | 64QAM | 873 | 5.1152 |
| 13 | 256QAM | R1 | S1 |
| 14 | 256QAM | R2 | S2 |
| 15 | 256QAM | R3 | S3 |

Comparing Table 3 with Table 2, Table 3 excludes three of the CQI indices indicating spectral efficiency that are in Table 2 and adds three new CQI indices designating 256QAM. However, the number of excluded CQI indices may vary depending on the embodiment. The CQI definition method 1 is advantageous in that the UE becomes capable of notifying the eNB of up to 256QAM using 4 bits but disadvantageous in that the accuracy of the channel status information decreases relatively as the average distance between spectral efficiencies designated by the CQI indices increases. The CQI definition method 1 may notify the UE whether it is applicable through higher layer signaling. That is, if the eNB has the 256QAM transmission capability and the UE has the 256QAM reception capability, the eNB instructs the UE to apply the CQI definition method 1 through higher layer signaling. In contrast, the eNB may instruct the UE to switch from the CQI definition method 1 to the legacy CQI definition method through the higher layer signaling.

The CQI definition method 2 provided by the present disclosure expands the information amount of CQI from 4 bits to 5 bits. In this case, the number of spectral efficiencies capable of being designated by CQI becomes a total of 32 and thus it is possible to support 256QAM without a reduction of channel status information accuracy as compared to the method 1. However, the second method is disadvantageous in that the extra information amount increases by 1 bit as compared to the legacy CQI. That is, in order to support the method 2, 5-bit CQI must be transmitted instead of legacy 4-bit CQI, resulting in extra uplink overhead and UE transmission power.

The CQI definition method 3 provided by the present disclosure changes the CQI range designated by 4-bit CQI adaptively depending on the situation, although the information amount of CQI is maintained as 4 bits.

According to an embodiment, the CQI definition method 3 uses two CQI tables. However, it is also possible to UE three or more CQI tables depending on the embodiment. In an embodiment, one of the two CQI tables may be the legacy CQI table as in Table 2 which cannot designate 256QAM. The other of the two CQI tables may be the CQI table capable of designating 256QAM. The CQI table capable of designating 256QAM is provided as Table 4.

TABLE 4

| CQI index | modulation | code rate × 1024 | efficiency |
|---|---|---|---|
| 0 | QPSK | 449 | 0.8770 |
| 1 | QPSK | 602 | 1.1758 |
| 2 | 16QAM | 378 | 1.4766 |
| 3 | 16QAM | 490 | 1.9141 |
| 4 | 16QAM | 616 | 2.4063 |
| 5 | 64QAM | 466 | 2.7305 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 64QAM | 948 | 5.5547 |
| 11 | 256QAM | R1 | S1 |
| 12 | 256QAM | R2 | S2 |
| 13 | 256QAM | R3 | S3 |
| 14 | 256QAM | R4 | S4 |
| 15 | 256QAM | R5 | S5 |

The CQI table as depicted in Table 4 is designed to support the spectral efficiency assuming 256QAM with CQI indices of 11, 12, 13, 14, and 15. However, the number of CQI indices may be determined differently depending on the embodiment. In Table 4, R1, R2, R3, R4, and R5 denote the channel coding rates for 256QAM, and S1, S2, S3, S4, and S5 denote spectral efficiencies for 256QAM. Typically, in the case of supporting 256QAM, the spectral efficiency increases as compared to the case of supporting 64QAM. That is, the values of S1, S2, S3, S4, and S5 are greater than 5.5547. In order to notify of the spectral efficiency in the case of using 256QAM, some CQI indices designating low spectral efficiencies for QPSK of Table 2 may be excluded. In this way, by switching between the CQI table of table 2 and the CQI table of Table 4 adaptively, the UE reports different values of spectral efficiency to the eNB depending on the CQI table being used. Although the UE may report a low region spectral efficiency in the case of using the CQI table of Table 2 to the eNB, it is impossible to report a high region spectral efficiency corresponding to 256QAM to the eNB.

The CQI definition method 3 is advantageous in that it can support 256QAM with 4-bit CQI without degradation of channel status information accuracy which is the case in the CQI definition method. However, the CQI definition method 3 must introduce a method of switching between two CQI tables, unlike the CQI definition methods 1 and 2. The present disclosure provides methods of switching between two CQI tables.

CQI table switching method 1: Switching based on higher layer signaling;
CQI table switching method 2: Switching based on physical layer signaling; and
CQI table switching method 3: Switching based on downlink scheduling information and ACK/NACK corresponding thereto.

The CQI table switching method 1 provided by the present disclosure is implemented using the higher layer signaling. In this method, if it is determined that 256QAM is supportable as a result of downlink channel state measurement in the state of using the CQI table of Table 2, the UE reports this to the eNB through higher layer signaling. If the report indicating availability of 256QAM is received from the UE through higher layer signaling, the eNB determines whether to switch the CQI table and notifies the UE of the determination result. Here, the CQI table switching determination procedure may be omitted. This means that the eNB performs CQI table switching as the UE has requested without an extra switching determination procedure. Likewise, switching from the CQI table of Table 4 (second CQI table) to the CQI table of Table 2 (first CQI table) may be triggered by the UE requesting the eNB.

Another method of switching the CQI table through higher layer signaling is implemented in such a way that the eNB determines whether to switch the CQI table based on the signal transmitted by the UE and notifies the UE of the determination result through higher layer signaling. Depending on the embodiment, the eNB measures the strength of the uplink signal of the UE to determine whether to switch the CQI table and notifies the UE of the determination result through higher layer signaling. According to an embodiment, if it is determined that the UE is close enough to the eNB based on the measurement of the received signal strength from the UE, the eNB may instruct the UE to apply the second CQI table supporting 256QAM through higher layer signaling. It is also possible to use the control information which the UE transmits to the eNB in association with the downlink status in addition to the method of measuring the received signal strength transmitted by the UE in uplink. The control information transmitted from the UE to the eNB in association with the downlink status may be any of Reference Signal Received Power (RSRP), Reference Signal Received Quality (RSRQ), and CQI. The RSRP is the measurement value of received signal strength of the downlink reference signal transmitted in a certain cell, and the RSRQ is the measurement value in consideration of the received signal strength of the downlink reference signal transmitted in a certain cell and interference strength. As described above, the CQI may indicate the maximum available data rate of the UE in downlink. All of the RSRP, RSRQ, and CQI are values acquired by measuring the downlink reference signal for report to the eNB, and the eNB determines whether the channel condition becomes available for the UE to support 256QAM based on one or any combination of these values.

Like the switching method 1, if it is determined to switch the second CQI table to the first CQI table, the eNB may notify the UE of the determination result through higher layer signaling.

Typically, the higher layer signaling has an extra time delay in a transmission and reception procedure as compared to the physical layer signaling. However, since the change of the channel condition between 256QAM-non-supportable state to a supportable state occurs in a few msec rather than every msec, the higher layer signaling is capable of securing the time long enough for switching.

The CQI table switching method 2 provided by the present disclosure is implemented using the physical layer signaling.

The UE sends the eNB the information on the CQI table to be used in uplink periodically through the physical layer signaling. In the present disclosure, the physical layer signaling is referred to as High Order Modulation Index (HOMI).

Figure 7:
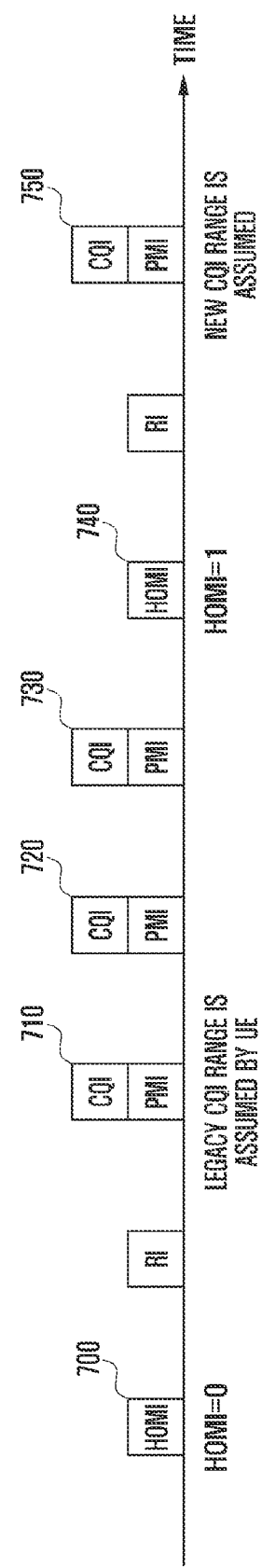
FIG. 7 is a diagram illustrating the High Order Modulation Index (HOMI) transmission of the UE according to an embodiment of the present disclosure.

FIG. 7 is a diagram illustrating the HOMI transmission of the UE according to an embodiment of the present disclosure.

Referring to FIG. 7, the UE transmits HOMI periodically as denoted by reference numbers 700 and 740. The HOMI is defined as follows: in this embodiment, the first CQI table denotes the legacy CQI table, and the second CQI table denotes the CQI table capable of designating 256QAM.

HOMI=0: Transmit a CQI index determined based on the first CQI table (Table 2).

HOMI=1: Transmit a CQI index determined based on the second CQI table (Table 4).

That is, in the case of setting HOMI to 0, the UE transmits the CQI index generated based on the first CQI table as denoted by reference numbers 710, 720, and 730. If it is determined that HOMI is set to 0, the eNB assumes that the UE generates the CQI index using the first CQI table before receiving the next HOMI. Accordingly, if the HOMI set to 0 is received as denoted by reference number 700, the eNB interprets the CQI index as denoted by reference numbers 710, 720, and 730 based on the first CQI table. If the HOMI set to 1 is received as denoted by reference number 740, the eNB uses the second CQI table for interpreting the CQI as denoted by reference number 750. For example, if the HOMI set to 0 is received at timing 700 and then the CQI index 12 is received at the timing 710, the eNB interprets the CQI index 12 as the indication of spectral efficiency corresponding to 64QAM using Table 2, and if the HOMI set to 1 is received at timing 740, then the CQI index 12 is received at the timing 750, where the eNB then interprets the CQI index 12 as the indication of spectral efficiency corresponding to 256QAM using Table 4.

The eNB may send the UE the information on which of the two CQI tables will be used in downlink through physical layer signaling. The physical downlink signal may be transmitted periodically or non-periodically. In more detail, the eNB measures the channel status and determines which of the two CQI tables to use based on the measurement result. The eNB may send the UE the information on the CQI table to be used. Depending on the embodiment, if it is determined that the channel condition is good enough to use 256QAM, the eNB may notify the UE of the use of the second CQI table through physical layer signaling. One of the methods of notifying the UE of the CQI table selected between the two CQI tables through the physical layer signaling is to use the MCS index value transmitted to the UE. The UE may determine the CQI table to use depending on whether the MCS level transmitted by the eNB is greater than a predetermined threshold. Likewise, the eNB may determine the CQI table to be used for generating the CQI transmitted by the UE afterward based on whether the MCS level transmitted to the UE is higher than a threshold. In a case where the threshold for use in determining CQI table to be used is set to 10, if the MCS level transmitted by the eNB is equal to or higher than 10, the CQI is generated using the second CQI table thereafter. Likewise, if the MCS level the eNB has notified the UE is higher than 10, the eNB assumes that the UE generates the CQI using the second CQI table thereafter. Such an MCS-based table switching method switches to the second CQI table in the case where the channel condition of the UE is relatively good and to the first CQI table in the case where the channel condition of the UE is relatively bad. This method is applicable to the case where the higher MCS level represents the higher spectral efficiency and, otherwise, the switching may be performed based on the spectral efficiency or the number of bits of the transport block size. Also, the determination may be made based on a part of the control information contained in Downlink Control Information (DCI) which the eNB sends the UE through PDCCH or E-PDCCH.

The CQI table switching method 3 provided by the present disclosure is of switching between CQI tables implicitly based on the control signal defined in the legacy LTE/LTE-A system other than using the extra higher layer signaling or physical layer signaling associated with the switching.

Figure 8:
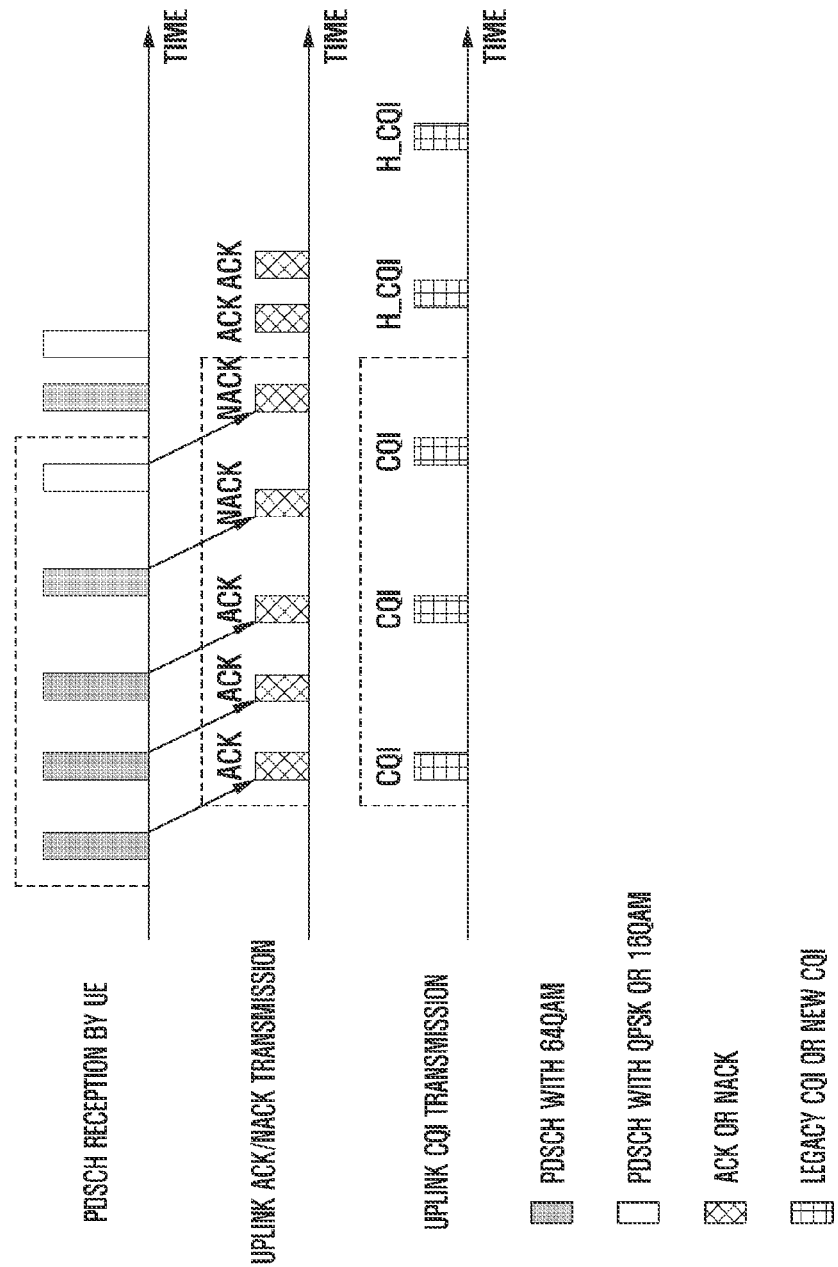
FIG. 8 is a diagram illustrating transmission timings in the case of using the CQI table switching method 3 according to an embodiment of the present disclosure.

FIG. 8 is a diagram illustrating transmission timings in the case of using the CQI table switching method 3 according to an embodiment of the present disclosure.

Referring to FIG. 8, switching between the first and second CQI tables is performed based on the scheduling information transmitted by the eNB and the ACK/NACK transmitted by the UE. That is, the UE observes the modulation order of PDSCH transmitted from the eNB to the UE in a predetermined time duration. It is assumed that the CQI table switching occurs when the modulation order of the PDSCH and ACK/NACK corresponding to the PDSCH transmitted in this time duration fulfils a predetermined condition. Also, the eNB performs table switching in correspondence to the method of interpreting the CQI transmitted by the UE under the assumption that the UE performs table switching in the same way. In an embodiment, the UE using the first CQI table assumes that if the modulation order of PDSCH scheduled to the UE in the time duration of 100 msec corresponds to 64QAM in an amount equal to or greater than 50%, and if an ACK is transmitted in correspondence to PDSCH transmitted with 64QAM in an amount equal to or greater than 90% the CQI transmitted thereafter is generated using the second CQI table. Otherwise, the UE using the second CQI table may assume that if the modulation order of PDSCH scheduled to the UE in the time duration of 100 msec corresponds to 64QAM in an amount less than 50% and if an ACK is transmitted in correspondence to PDSCH transmitted with 64QAM in an amount equal to or greater than 90%, the CQI transmitted thereafter is generated using the first CQI table. The value used for determination may be determined depending on the embodiment.

In the CQI table switching method depicted in FIG. 8, the CQI table switching is determined by the eNB and the UE based on the percentage of 64QAM among the modulation orders of PDCCH scheduled for the terminal and the percentage of the ACK messages among the ACK/NACK messages corresponding to PDSCH. It is also possible to use the method of determining the CQI table switching by taking only the percentage of 64QAM among the modulation orders of PDSCH into consideration. That is, the UE in the state of using the first CQI table switches to the second CQI table when the percentage of 64QAM is equal to or greater than a predetermined threshold, and the UE in the state of using the second CQI table switches to the first CQI when the percentage of 64QAM is equal to or less than a predetermined threshold.

In the case of using one of the CQI table switching methods 2 and 3, if an error occurs at the eNB or UE, the eNB may interpret the CQI as transmitted by the UE using an incorrect CQI table, resulting in degradation of system performance. Preparing for error occurrence, the present disclosure provides a second CQI table supporting 256QAM capable of reducing the influence of the reception error as shown in Table 5.

TABLE 5

| CQI index | modulation | code rate × 1024 | efficiency |
|---|---|---|---|
| 0 | 256QAM | R1 | S1 |
| 1 | 256QAM | R2 | S2 |
| 2 | 256QAM | R3 | S3 |
| 3 | 256QAM | R4 | S4 |
| 4 | 256QAM | R5 | S5 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 5 differs from Table 4 in that the spectral efficiency values designated by some CQI indices therein are identical with the spectral efficiency values designated by CQI indices of the first CQI table. The value of CQI Index designating 256QAM which is provided by this embodiment may be determined differently from other embodiments. That is, the modulation orders and spectral efficiencies designated by CQI index 5 to CQI index 15 are identical in Tables 5 and 2. Table 5 differs from Table 2 in that the CQI index designating the low spectral efficiency region is changed to designate the spectral efficiency of the case of using 256QAM. Accordingly, although an error occurs in the process of receiving HOMI, the eNB may interpret incorrectly only when the UE reports the changed CQI index. That is, although the eNB interprets HOMI=1 transmitted by the UE to HOMI=0, if the UE notifies the eNB of CQI indices 5 to 15 of Table 5, the eNB cannot interpret the CQI index incorrectly.

As aforementioned, another prerequisite for supporting 256QAM in the LTE system is the MCS notification method capable of designating 256QAM. In LTE Release 11 and earlier, there is no way for the eNB to notify the UE of 256QAM PDSCH transmission, and thus it is impossible in LTE Release 11 and earlier to support 256QAM. In the present disclosure, the eNB is capable of notifying the UE of 256QAM-modulated PDSCH as follows:

256QAM-supportable MCS notification method 1: extend the control information amount for notifying of MCS from 5 bits to 6 bits; and
  256QAM-supportable MCS notification method 2: associate a range of control information notifying of MCS with a change of CQI.

In the 256QAM-supportable MCS notification method 1, the control information amount for MCS notification is extended from 5 bits to 6 bits. In this case, 256QAM notification is achieved but an increase of control information amount by even as much as a single bit causes measurable performance degradation and, in order to expect at least the same performance as before the 1-bit extension, it is necessary to allocate extra transmission energy.

In the 256QAM-supportable MCS notification method 2, the eNB changes the MCS definition method according to the change of the CQI definition method at the UE. That is, in the case that table switching occurs between two tables according to the CQI definition method 3, if the UE transmits the CQI generated using the first CQI table which does not support 256QAM, the eNB generates the MCS index according to the legacy MCS table as Table 1. Also, the UE interprets the MCS index in association with the legacy MCS table. Otherwise if the UE transmits the CQI generated using the second CQI table supporting 256QAM, the eNB generates the MCS index according to the MCS table supporting 256QAM. Table 6 exemplifies the MCS table supporting 256QAM. Table 6 is an MCS table according to an embodiment, and the modulation order, Transport Block Size (TBS) index, and TBS size of the MCS index may be determined differently.

TABLE 6

| MCS Index: $I_{MCS}$ | Modulation Order: $Q_m$ | TBS Index: $I_{TBS}$ | TBS Size | Spectral Efficiency (bps/Hz) |
|---|---|---|---|---|
| 0 | 8 | 27 | X0 | R0 |
| 1 | 8 | 28 | X1 | R1 |
| 2 | 8 | 29 | X2 | R2 |
| 3 | 8 | 30 | X3 | R3 |
| 4 | 8 | 31 | X4 | R4 |
| 5 | 8 | 32 | X5 | R5 |
| 6 | 8 | 33 | X6 | R6 |
| 7 | 2 | 7 | 712 | 0.659259 |
| 8 | 2 | 8 | 808 | 0.748148 |
| 9 | 2 | 9 | 936 | 0.866667 |
| 10 | 4 | 9 | 936 | 0.866667 |
| 11 | 4 | 10 | 1032 | 0.955556 |
| 12 | 4 | 11 | 1192 | 1.103704 |
| 13 | 4 | 12 | 1352 | 1.251852 |
| 14 | 4 | 13 | 1544 | 1.42963 |
| 15 | 4 | 14 | 1736 | 1.607407 |
| 16 | 4 | 15 | 1800 | 1.666667 |
| 17 | 6 | 15 | 1800 | 1.666667 |
| 18 | 6 | 16 | 1928 | 1.785185 |
| 19 | 6 | 17 | 2152 | 1.992593 |
| 20 | 6 | 18 | 2344 | 2.17037 |
| 21 | 6 | 19 | 2600 | 2.407407 |
| 22 | 6 | 20 | 2792 | 2.585185 |
| 23 | 6 | 21 | 2984 | 2.762963 |
| 24 | 6 | 22 | 3240 | 3 |
| 25 | 6 | 23 | 3496 | 3.237037 |
| 26 | 6 | 24 | 3624 | 3.355556 |
| 27 | 6 | 25 | 3752 | 3.474074 |
| 28 | 6 | 26 | 4392 | 4.066667 |
| 29 | 2 | reserved | | |
| 30 | 4 | | | |
| 31 | 6 | | | |

The MCS notification method 2 can be applied to the case of using the CQI definition method 1. If the eNB instructs the UE to use the CQI definition method 1, the UE changes the MCS index interpretation method to be one capable of supporting 256QAM and, otherwise if the eNB instructs the UE to use the legacy CQI definition method, the UE changes the MCS index interpretation method to the conventional one. According to an embodiment, the CQI interpretation method and the MCS interpretation method may be determined independently.

In the LTE system, the UE is configured to support the transmission mode designated by the eNB. The Release 11 LTE system supports a total of 10 transmission modes that are distinct from each other in the use of multiple antennas for PDSCH transmission. For example, the transmission mode 9 supports MIMO transmission of PDSCH using up to 8 transmit antennas, and the transmission mode 2 supports diversity transmission of PDSCH using up to 4 transmit antennas. The transmission mode is designated per UE, and the control information format to be received by the UE is changed depending on the transmission mode. In addition to the transmission mode, the LTE/LTE-A system supports fallback transmission. The fallback transmission is conceived to transmit data to the UE operating in the base channel condition.

For example, if the downlink transmission scheme according to the transmission mode is not appropriate for the channel condition of the UE, the eNB changes the transmission mode of the UE using the fallback transmission. The fallback transmission is also responsible for maintaining a stable communication function between the UE and the eNB during the change of the UE configuration. For example, if the eNB changes the transmission mode through a higher layer signal, it takes a certain time to make sure that the UE applies the changed transmission mode. In this time duration, the eNB cannot check whether the UE is aware of the transmission mode. In an embodiment, it is possible to determine the MCS index interpretation method depending on whether the fallback transmission is used.

As aforementioned, the eNB uses different DCI formats when it transmits PDSCH according to the transmission mode configured to the UE and when it transmits PDSCH according to the fallback transmission. The DCI formation denotes the format of configuring the control information in the control channel, i.e. PDCCH/E-PDCCH in LTE. For example, the transmission mode 9 uses DCI format 2C. The fallback transmission uses DCI formation 1A. By checking the DCI format, the UE is capable of determining whether PDSCH addressed to it is the transmission mode-based transmission or the fallback transmission-based transmission.

The present disclosure provides the method of applying the MCS index interpretation scheme depending on the PDSCH is transmitted according to the fallback transmission or transmission mode. In this case, if the eNB interprets HOMI transmitted by the UE incorrectly, the misinterpretation is restricted to the DCI format interpretation based on the fallback mode. That is, the UE determines whether the PDSCH is transmitted based on the fallback transmission or the transmission mode and, if the PDSCH is transmitted based on the fallback transmission, applies the legacy MCS index interpretation method, and otherwise, if transmitted based on the transmission mode, applies the MCS index interpretation method provided by the present disclosure. This can be summarized as follows:

- If the control information on PDSCH is received through DCI format IA, the UE uses the legacy MCS index interpretation method.
- If the control information on PDSCH is received through DCI format according to the transmission mode, the UE uses the MCS index interpretation method of the present disclosure.

The LTE system supports a normal cyclic prefix and an extended cyclic prefix. Typically, the cyclic prefix is introduced to eliminate inter symbol interference in the OFDM-based mobile communication system and, as its length increases, becomes advantageous in the large cell. The normal cyclic prefix is designed for use in relatively small/medium size cells having relatively short delay spread, and the extended cyclic prefix is for use in large cells having relatively long delay spread. Another method for interpreting the MCS index is based on whether the cyclic prefix configured by the eNB is the extended cyclic prefix or the normal cyclic prefix. If the normal cyclic prefix is configured and if both the eNB and UE are capable of supporting 256QAM communication, the UE uses the MCS index interpretation method of the present disclosure. Otherwise, if the extended cyclic prefix is configured, the UE uses the legacy MCS index interpretation method independently of the 256QAM capability of the UE and the eNB. The reason for the use of the legacy MCS index interpretation method in the case of using the extended cyclic prefix is because the extended cyclic prefix designed for large cells is not likely to be used along with 256QAM.

Figure 9:
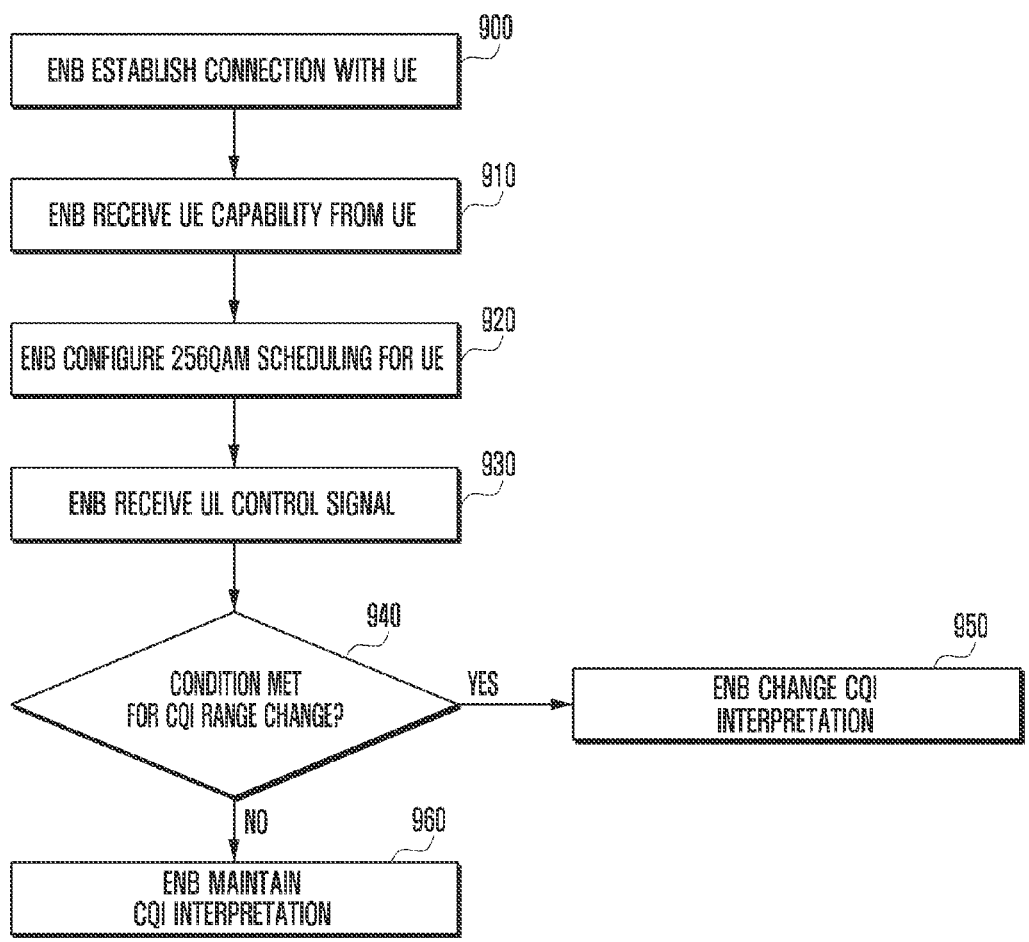
FIG. 9 is a flowchart illustrating the CQI table switching method of the eNB according to an embodiment of the present disclosure.

FIG. 9 is a flowchart illustrating the CQI table switching method of the eNB according to an embodiment of the present disclosure.

Referring to FIG. 9, the eNB establishes a connection with the UE at operation 900.

Once the connection has been established, the eNB receives the UE capability from the UE at operation 910. In this embodiment, the UE capability includes control information on whether the UE supports 256QAM.

If the UE is capable of receiving a 256QAM signal, the eNB configures 256QAM to the UE at operation 920. This is of notifying the UE that 256QAM signal may be transmitted on a PDSCH afterward. Depending on the embodiment, operation 920 may be implemented in such a way that the eNB configures a transmission mode to the UE.

Afterward, the eNB receives an uplink control channel transmitted by the UE at operation 930. The uplink control channel may include at least one of the control information having at least one of CQI and HOMI, ACK/NACK corresponding to downlink PDSCH, RSRP, and RSRQ.

The eNB determines whether to change the CQI table based on the control channel or the control information carried on the control channel at operation 940. In the case of HOMI-based switching determination, the eNB determines the CQI table to be used based on the HOMI value.

The eNB performs CQI switching at operation 950 or maintains the CQI table at operation 960 based on the determination result at operation 940. Afterward, the eNB interprets the CQI transmitted by the UE based on the CQI table determined at operations 950 or 960.

Figure 10:
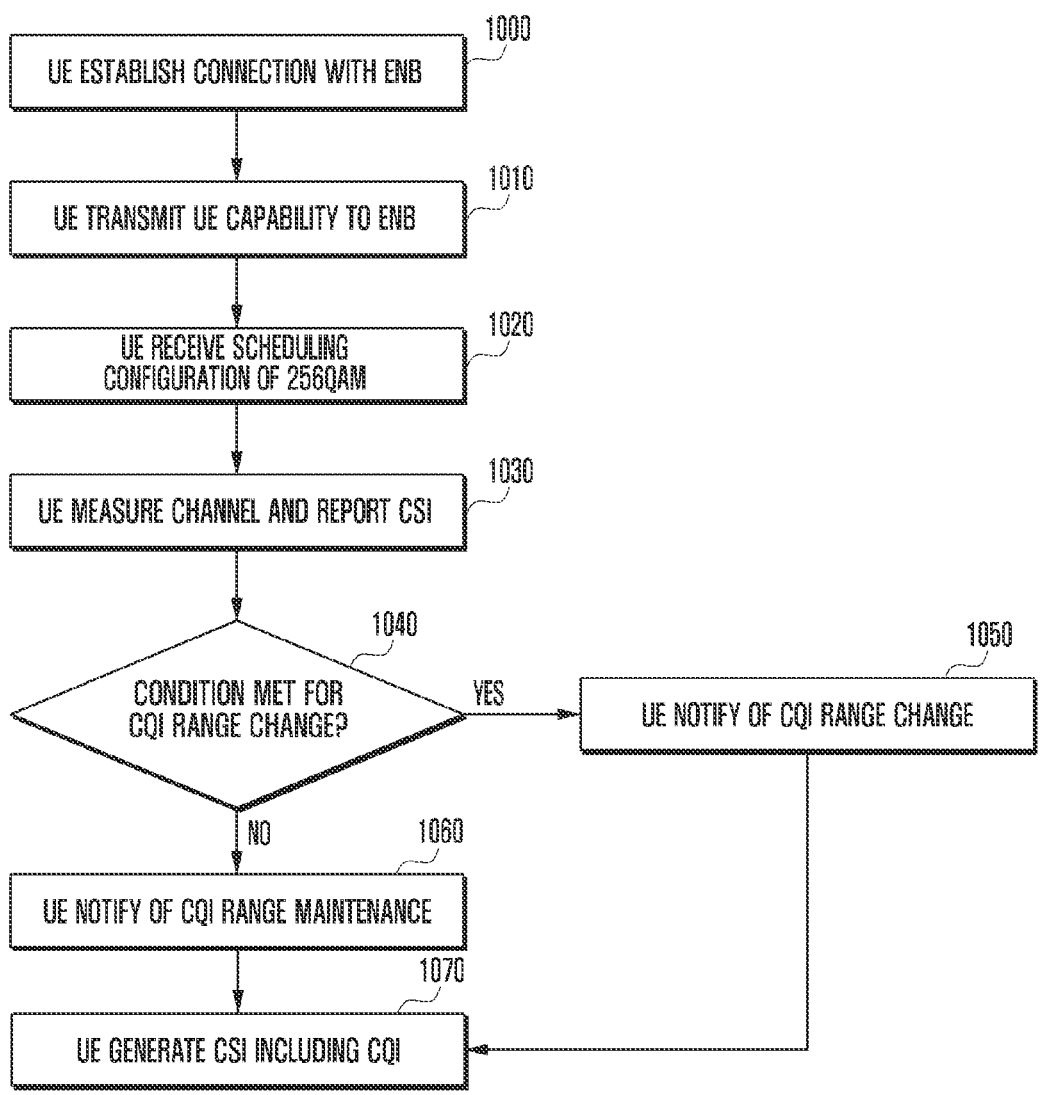
FIG. 10 is a flowchart illustrating the CQI table switching method of the UE according to an embodiment of the present disclosure.

FIG. 10 is a flowchart illustrating the CQI table switching method of the UE according to an embodiment of the present disclosure.

Referring to FIG. 10, the UE establishes a connection with the eNB at operation 1000.

Afterward, the UE reports UE capability to the eNB at operation 1010. The UE capability includes the information on whether the UE is capable of receiving a 256QAM signal.

Afterward, the UE receives the modulation configuration information capable of receiving PDSCH transmitted with 256QAM at operation 1020. Depending on the embodiment, the modulation configuration information may be received through higher layer signaling or physical layer signaling. In the embodiment of FIG. 10, it is assumed that the UE measures downlink for CQI table switching.

In order to accomplish this, the UE measures the downlink channel to generate Channel Status Information (CSI) and transmits the CSI to the eNB at operation 1030.

If it is determined to change the CQI table at operation 1040, the UE notifies the eNB of the CQI table switching at operation 1050. Otherwise if it is determined to maintain the current CQI table, the UE notifies the eNB of this determination result at operation 1060. This notification is performed through HOMI or higher layer signaling. Afterward, the UE generates the CQI using the CQI table notified to the eNB and transmits the CQI to the eNB at operation 1070.

Figure 11:
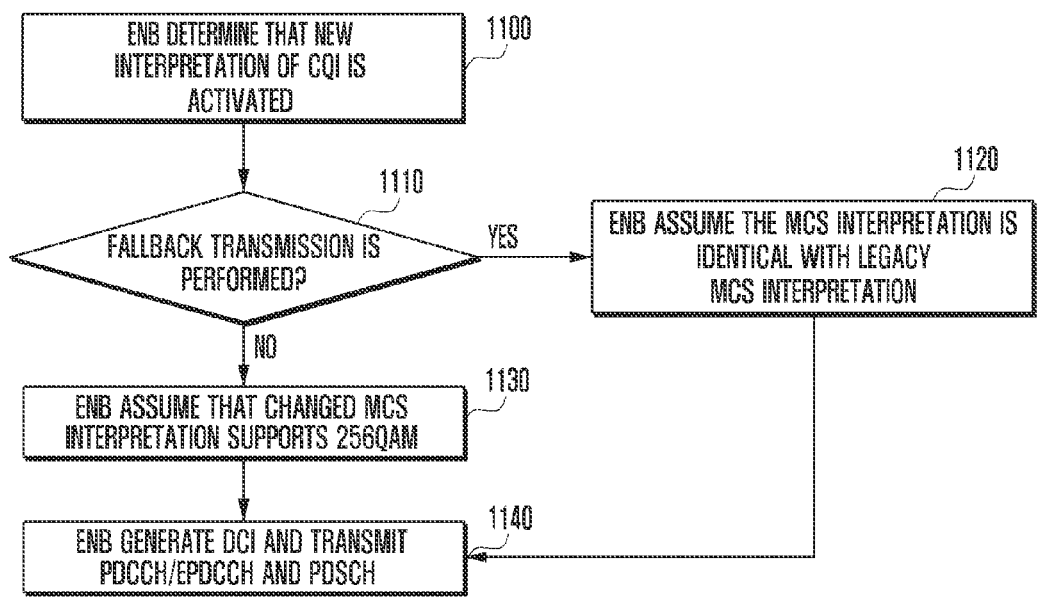
FIG. 11 is a flowchart illustrating a fallback transmission-based Modulation and Coding Scheme (MCS) index interpretation method of the eNB according to an embodiment of the present disclosure.

FIG. 11 is a flowchart illustrating a fallback transmission-based MCS index interpretation method of the eNB according to an embodiment of the present disclosure.

Referring to FIG. 11, the eNB determines that the new CQI definition method is applied at operation 1100. The new CQI definition method may include the CQI definition method capable of communicating 256QAM signal. As described above, the UE may apply the new MCS interpretation method in a transmission mode-based PDSCH transmission.

Afterward, the eNB determines whether to transmit PDSCH based on the fallback transmission or the transmission mode at operation 1110.

If it is determined to transmit PDSCH based on the fallback transmission, the eNB determines the MCS index to be transmitted to the UE using the legacy MCS definition method at operation 1120 and transmits the MCS index along with the PDSCH on the PDCCH or E-PDCCH in DCI formation 1A to the UE at operation 1140.

Otherwise if it is determined to transmit PDSCH based on the transmission mode at operation 1110, the eNB determines the MCS index to be transmitted to the UE using the new MCS definition method at operation 1130 and transmits the MCS index along with the PDSCH in DCI formation corresponding to the transmission mode at operation 1140.

In this embodiment, when the PDSCH is transmitted based on the fallback transmission, the eNB may interpret the MCS in the legacy MCS interpretation method regardless of the MCS interpretation type applied previously. This interpretation method is capable of reducing errors in data communication.

Figure 12:
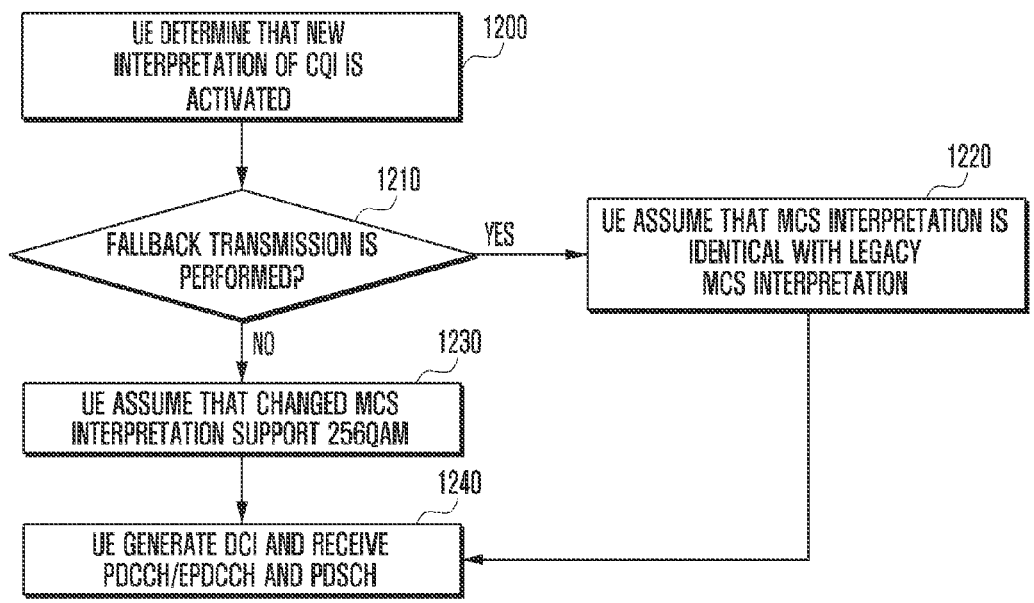
FIG. 12 is a flowchart illustrating the fallback transmission-based MCS index interpretation method of the UE according to an embodiment of the present disclosure.

FIG. 12 is a flowchart illustrating the fallback transmission-based MCS index interpretation method of the UE according to an embodiment of the present disclosure.

Referring to FIG. 12, the UE determines that the new CQI definition method is applied at operation 1200.

Afterward, the UE determines whether the received PDSCH is transmitted based on the fallback transmission or transmission mode at operation 1210. This determination may include the method of determining whether the received DCI formation is DCI formation 1A or a DCI formation determined according to the transmission mode. If the blind decoding under the assumption of DCI formation 1A is successful, the UE assumes that the DCI formation 1A has been received and the PDSCH has been transmitted based on the fallback transmission. Otherwise, if the blind decoding under the assumption of the DCI formation determined according to the transmission mode is successful, the UE assumes that the corresponding DCI format has been received and the PDSCH has been transmitted based on the transmission mode.

If it is determined that the PDSCH is transmitted in the fallback transmission mode, the UE assumes the legacy MCS interpretation method at operation 1220 and interprets the MCS index carried on PDCCH/E-PDCCH to decode PDSCH at operation 1240.

Otherwise if it is determined that the PDSCH is transmitted in the transmission mode, the UE assumes the new MCS interpretation method at operation 1230 and interprets the MCS index carried on PDCCH/E-PDCCH to decode PDSCH at operation 1240. The new MCS interpretation method may include the MCS interpretation method capable of being used in 256QAM data communication.

In the embodiment of FIG. 12, it is possible to decode PDSCH using the legacy MCS interpretation method regardless of the previously applied MCS interpretation method depending on whether the fallback transmission mode is applied. This makes it possible to reduce errors in data communication.

Figure 13:
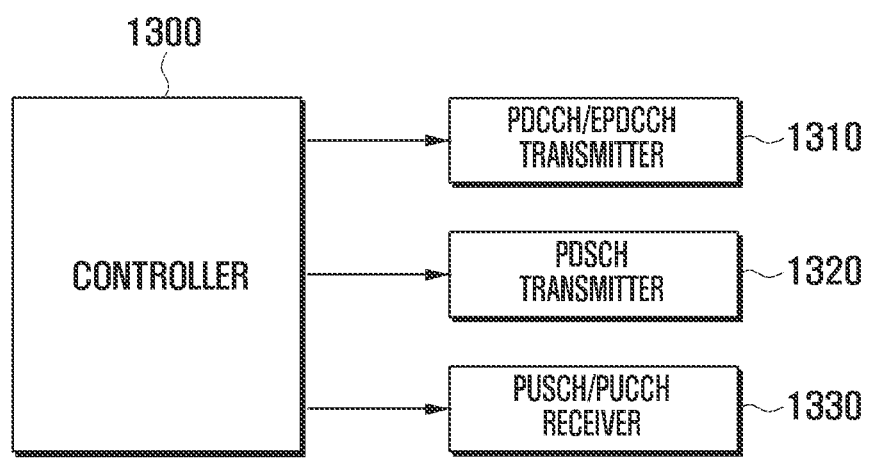
FIG. 13 is a block diagram illustrating a configuration of the eNB according to an embodiment of the present disclosure.

FIG. 13 is a block diagram illustrating a configuration of the eNB according to an embodiment of the present disclosure.

Referring to FIG. 13, the eNB may include at least one of a controller 1300, a PDCCH/EPDCCH transmitter 1310, a PDSCH transmitter 1320, and a Physical Uplink Shared Channel (PUSCH)/Physical Uplink Control Channel (PUCCH) receiver 1330.

The controller 1300 determines a time when the CQI interpretation method and MCS definition method are changed and how to interpret the CQI and determine the MCS based thereon. That is, the controller 1300 controls the uplink channel receiver 1330 to receive the uplink channel transmitted by the UE, and the received signal may include the CQI index transmitted by the UE in the uplink. The eNB interprets the CQI index according to an appropriate CQI interpretation method for use in UE scheduling. The CQI interpretation method may be the legacy CQI interpretation method or the new CQI interpretation method. The new CQI interpretation method may include the CQI interpretation method capable of supporting 256QAM as provided by an embodiment of the present disclosure.

The controller 1300 determines an MCS index according to the MCS definition method of a certain UE, controls the control channel transmitter 1310 to transmit the MCS index to the UE, and controls the data channel transmitter 1320 to transmit PDSCH according to the MCS. The MCS definition method of the UE may include at least one of the legacy MCS definition method and the new MCS definition method. The MCS definition method may include the MCS definition method capable of supporting 256QAM data communication as provided by an embodiment of the present disclosure.

The eNB may further include a transceiver capable of transmitting and receiving higher layer signals.

Figure 14:
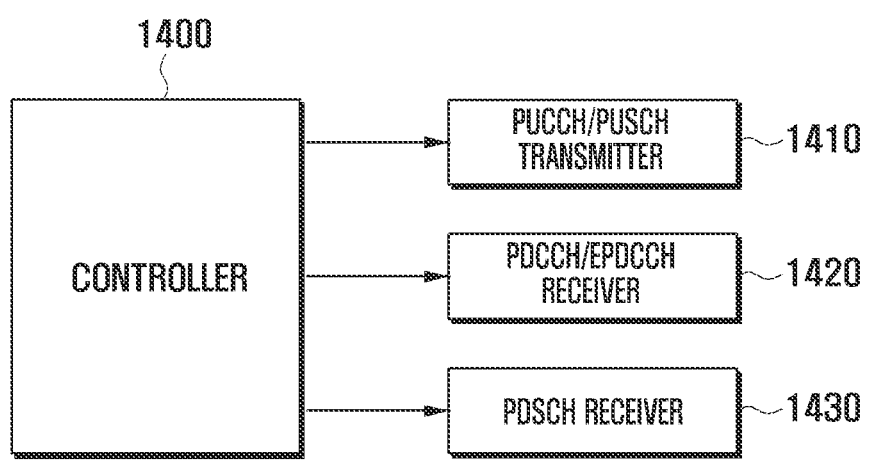
FIG. 14 is a block diagram illustrating a configuration of the UE according to an embodiment of the present disclosure.

FIG. 14 is a block diagram illustrating a configuration of a UE according to an embodiment of the present disclosure.

Referring to FIG. 14, the UE may include at least one of a controller 1400, a PUCCH/PUSCH transmitter 1410, a PDCCH/EPDCCH receiver 1420, and a PDSCH receiver 1430.

The controller 1400 determines when the CQI definition method and the MCS interpretation method are changed and how to define the CQI index and interpret the MCS index based thereon. The CQI index definition method may include at least one of the legacy CQI definition method and the new CQI definition method. The new CQI definition method may include the CQI definition method capable of supporting 256QAM data communication provided by the present disclosure.

That is, the controller 1400 may control the control channel receiver 1420 to receive the MCS index transmitted by the eNB and control the data channel receiver 1430 to receive PDSCH based on the MCS index. The controller 1400 also determines a CQI index according to the CQI definition method and controls the uplink channel transmitter 1420 to transmit the CQI index to the eNB.

The UE also may further include a transceiver capable of transmitting and receiving higher layer signals.

Figure 15:
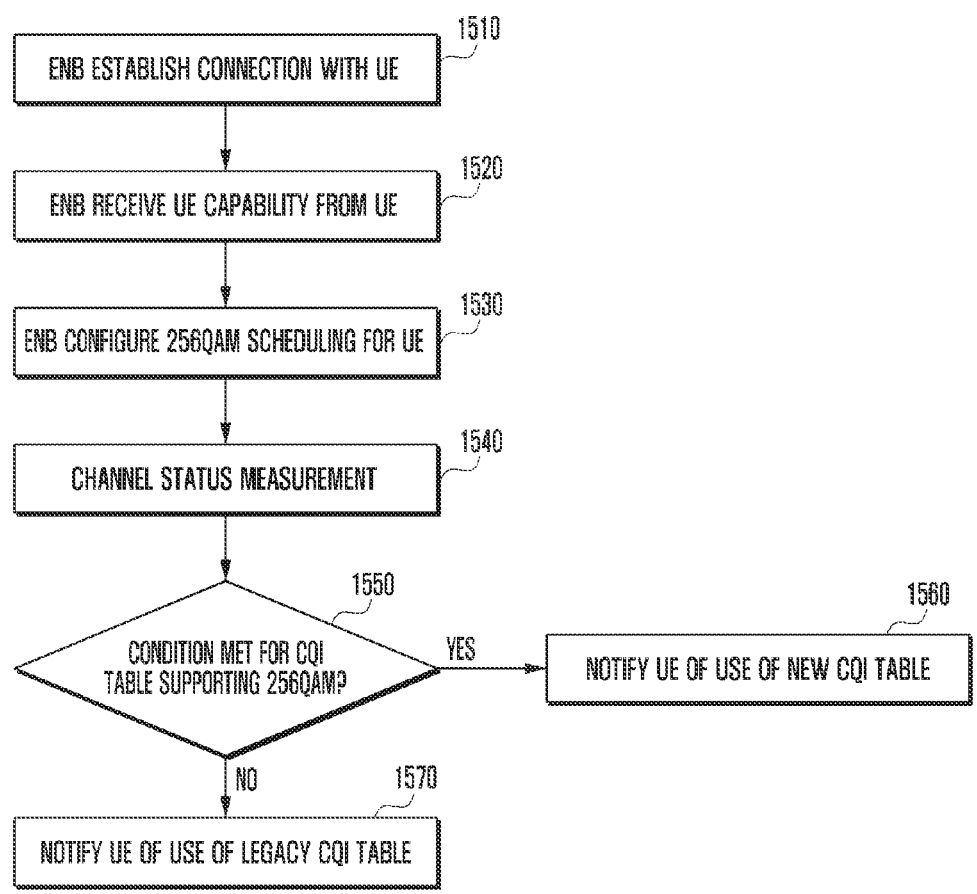
FIG. 15 is a flowchart illustrating a channel status-adaptive CQI interpretation method determination method of the eNB according to an embodiment of the present disclosure.

FIG. 15 is a flowchart illustrating a channel status-adaptive CQI interpretation method determination method of the eNB according to an embodiment of the present disclosure.

Referring to FIG. 15, the eNB establishes a connection with the UE at operation 1510.

Next, the eNB receives the UE capability from the corresponding UE at operation 1520. In this embodiment, the UE capability may include the control information on whether the UE is capable of supporting 256QAM.

If the UE is capable of 256QAM, the eNB configures 256QAM to the UE at operation 1530. This is of notifying the UE that 256QAM-modulated PDSCH may be transmitted afterward. Depending on the embodiment, operation 1520 may be implemented as the method for the eNB to determine the transmission mode to the UE.

Next, the eNB measures the channel status at operation 1540. The channel status measurement may be performed based on the channel status information reported by UE.

At operation 1550, the eNB determines whether the new CQI interpretation method is applicable based on the channel status measured at operation 1540. The new CQI interpretation method may include the CQI interpretation method capable of communicating 256QAM signal provided by the present disclosure. According to an embodiment, if the channel status is good enough to communicate data with 256QAM, the eNB may determine to use the new CQI interpretation method. If the channel status is good, this means that the channel status is equal to or better than a threshold.

If the channel status fulfils the condition at operation 1550, the eNB notifies the UE of using the new CQI interpretation method at operation 1560. In more detail, the eNB may notify the UE of the use of the new CQI interpretation method through one of higher layer signaling and physical layer signaling.

If the channel status does not fulfill the condition at operation 550, the eNB notifies the UE of using the legacy CQI interpretation method at operation 1570. In more detail, the eNB may notify the UE of the use of the legacy CQI interpretation method through one of the higher layer signaling and physical layer signaling. According to an embodiment, the notification operation may be omitted when it is determined to use the legacy CQI interpretation method.

Figure 16:
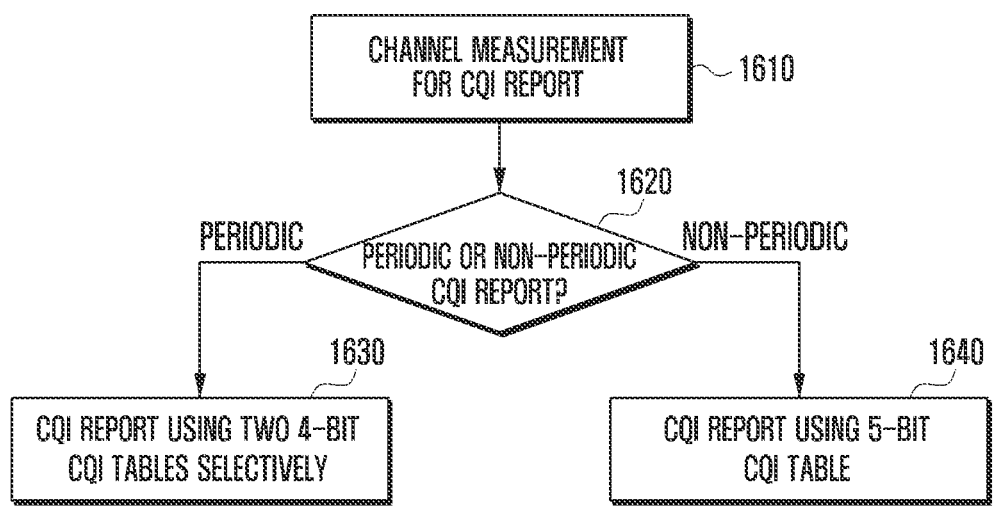
FIG. 16 is a flowchart illustrating the CQI report method of the UE according to an embodiment of the present disclosure.

FIG. 16 is a flowchart illustrating the CQI report method of the UE according to an embodiment of the present disclosure.

Referring to FIG. 16, the UE performs channel measurement for a CQI report at operation 1610. The channel measurement is performed based on the signal received from the eNB.

The UE determines whether the CQI report is the periodic CQI report or the non-periodic CQI at operation 1620.

If the CQI report is the periodic CQI report, the UE performs CQI report using the legacy CQI interpretation method and the new CQI interpretation method selectively at operation 1630. In more detail, the new CQI interpretation method includes the CQI interpretation method of the present disclosure capable of communicating 256QAM data and capable of transmitting a CQI index with the same number of bits as the legacy CQI interpretation method.

Otherwise, if the CQI report is the non-periodic CQI report, the UE reports CQI to the eNB using a 5-bit CQI table at operation 1640. In more detail, since the non-periodic CQI report requires the UE to report more accurate CQI information and is performed sparsely as compared to the periodic CQI report, it may not cause any significant problem to use more bits for the CQI report and thus the 5-bit CQI table can be used for the CQI report to the eNB.

Also, the eNB may apply different CQI interpretation methods selectively depending on whether the CQI report of the UE is the periodic CQI or the non-periodic CQI. According to an embodiment, if the CQI report of the UE is the periodic CQI, the eNB interprets the CQI index using the legacy CQI table, and otherwise, if the CQI report of the UE is the non-periodic CQI, the eNB interprets the CQI index using the new CQI table provided by the present disclosure.

The LTE system supports a normal cyclic prefix and an extended cyclic prefix. Unlike the subframe with the normal cyclic prefix which consists of 14 OFDM symbols as shown in FIG. 2, the subframe with the extended cyclic subframe consists of 12 OFDM symbols. Accordingly, when the extended cyclic prefix is used, the radio resource region available to be used between the eNB and the UE is restricted as compared to the case of using the normal cyclic prefix. For example, the current LTE system is designed such that the UE is capable of transmitting a CQI and a Precoding Matrix Indicator (PMI) of up to 13 bits simultaneously using the PUCCH format 2/2a/2b.

Figure 17:
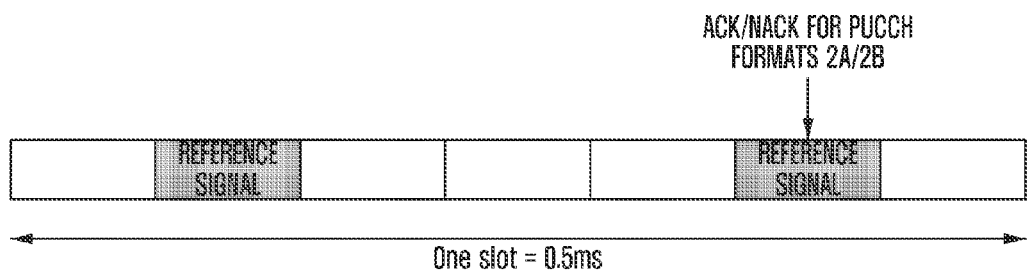
FIG. 17 is a diagram illustrating a structure of Physical Uplink Control Channel (PUCCH) format 2/2a/2b in the LTE system using the normal cyclic prefix according to an embodiment of the present disclosure.

FIG. 17 is a diagram illustrating a structure of PUCCH format 2/2a/2b in the LTE system using the normal cyclic prefix according to an embodiment of the present disclosure.

Referring to FIG. 17, in the system using the normal cyclic prefix, the UE is capable of transmitting to the eNB the CQI and the PMI of up to 13 bits using the symbols with the exception of the symbols to which reference signals are mapped. If it is necessary to transmit an ACK/NACK along with the CQI and PMI, the ACK/NACK is mapped to the second reference signal position in a slot.

Figure 18:
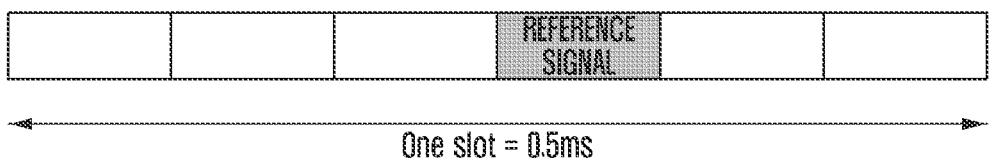
FIG. 18 is a diagram illustrating a structure of PUCCH format 2 in the LTE system using the extended cyclic prefix according to an embodiment of the present disclosure.

FIG. 18 is a diagram illustrating a structure of PUCCH format 2 in the LTE system using the extended cyclic prefix according to an embodiment of the present disclosure.

Referring to FIG. 18, since there is only one symbol to which the reference signal is mapped in one slot in the case of using the extended cyclic prefix between the eNB and the UE, although it is necessary to transmit an ACK/NACK along with the CQI and PMI, the reference signal position cannot be used for the ACK/NACK, unlike the case of using the normal cyclic prefix. Accordingly, when the eNB uses the extended cyclic prefix, the UE performs joint coding on the CQI, PMI, and ACK/NACK for simultaneous transmission. For the eNB using the extended cyclic prefix, the UE may transmit the information including at least one of a CQI and a PMI in the range of up to 11 bits. This means that the 5-bit or more CQI table cannot be transmitted on the PUCCH to the eNB using the extended cyclic prefix, unlike the case of using the normal cyclic prefix. Accordingly, the cyclic prefix length-based CQI table switching method can be defined as follows:

CQI table switching method 4: switching based on a cyclic prefix length used between eNB and UE.

The CQI table switching method 4 provided by an embodiment of the present disclosure may make a CQI table switching determination based on the length of the cyclic prefix.

In more detail, the UE and the eNB may change the CQI table based on the length of the cyclic prefix used therebetween.

In an embodiment, if the eNB is capable of transmitting the 256QAM signal and if the UE is capable of receiving the 256QAM signal, the eNB and UE may use the legacy CQI transmission method, other than supporting 256QAM with reference to the CQI table as shown in Table 2, or may support 256QAM without an extra information amount by referencing the 4-bit CQI table provided in Tables 3, 4, and 5.

When the eNB is capable of transmitting 256QAM signal and the UE is capable of receiving 256QAM signal, if the normal cyclic prefix is used, the eNB and the UE may support 256QAM by referencing the 5-bit CQI table of the CQI definition method 2 or more-bit CQI table.

In an embodiment, although it can be considered to use the legacy CQI table not supporting 256QAM for the case of using the extended prefix and the CQI table supporting 256QAM for the case of using the normal cyclic prefix, various CQI tables can be applied depending on the case.

The CQI table switching method 4 is advantageous in that the 256QAM can be supported using the 5-bit CQI table without a reduction of channel status information accuracy at least with the normal cyclic prefix, because it is possible to switch between the 4-bit CQI table and 5-bit CQI table according to the cyclic prefix length. Since both the eNB and UE can check the cyclic prefix length of the eNB, the CQI table switching can be performed accordingly.

Figure 19:
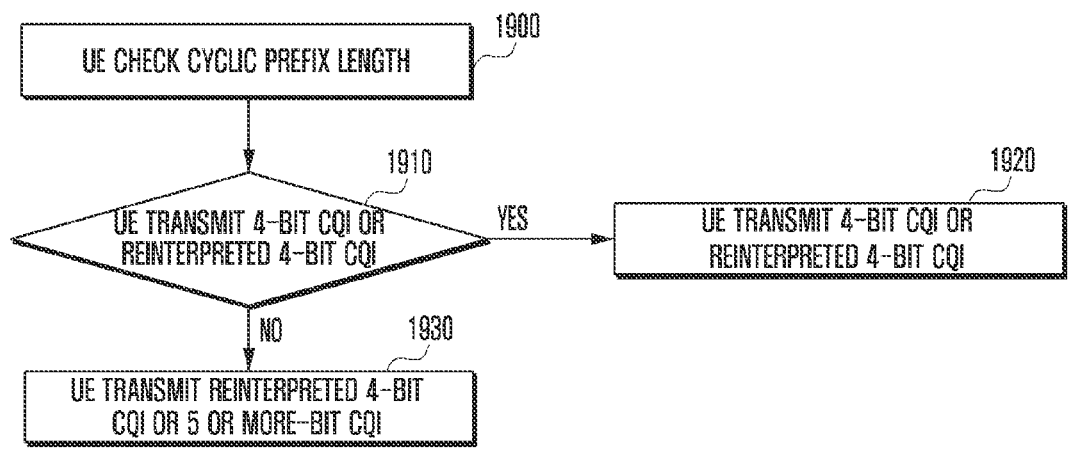
FIG. 19 is a flowchart illustrating the cyclic prefix length-based CQI table switching method of the UE according to an embodiment of the present disclosure.

FIG. 19 is a flowchart illustrating the cyclic prefix length-based CQI table switching method of the UE according to an embodiment of the present disclosure.

Referring to FIG. 19, the UE checks the length of the cyclic prefix of the eNB at operation 1900.

At operation 1910, the UE determines whether to change the CQI table based on the cyclic prefix length checked at operation 1900. If the cyclic prefix of the eNB is the extended cyclic prefix at operation 1910, the UE references the legacy O-bit CQI table as Table 2 or the reinterpreted 4-bit tables provided in Tables 3, 4, and 5 at operation 1920 to transmit a 4-bit CQI at operation 1920.

Otherwise, if the cyclic prefix of the eNB is the normal cyclic prefix at operation 1910, the UE references the 5-bit CQI table as in the CQI switching method 2 or more-bit CQI table to transmit the CQI at operation 1930.

Table 7 shows a maximum number of bits capable of being transmitted on PUCCH in the case of using the extended cyclic prefix with a 5-bit CQI table.

For the eNB using the extended cyclic prefix as in indices 4, 9, 11, and 15 in Table 7, the PUCCH transmission modes in which the UE cannot switch to the 5-bit CQI table occur when the most recently reported RI is greater than 1. That is, if the RI which the eNB has reported most recently is 1 in association with the eNB using the extended cyclic prefix, the UE can transmit the 5-bit CQI. Accordingly, in the case that the eNB is capable of transmitting 256QAM signal and the UE is capable of receiving the 256QAM signal, if the RI which the UE has reported to the eNB using the extended cyclic prefix most recently is greater than 1, the eNB and the UE do not support 256QAM by referencing the CQI table as in Table 2 or support 256QAM without extra information by referencing the reinterpreted 4-bit CQI tables provided in Tables 3, 4, and 5.

In the case that the eNB is capable of transmitting the 256QAM signal and the UE is capable of receiving the 256QAM signal, if the RI which the UE has reported to the eNB using the extended cyclic prefix most recently is not

TABLE 7

| | | | PUCCH Reporting Modes | | | |
| --- | --- | --- | --- | --- | --- | --- |
| Index | Reported | Mode State | Mode 1-1 (bits/BP) | Mode 2-1 (bits/BP) | Mode 1-0 (bits/BP) | Mode 2-0 (bits/BP) |
| 1 | Sub-band | RI = 1 | NA | 5 + L | NA | 4 + L |
| 2 | CQI | RI > 1 | NA | 8 + L | NA | 4 + L |
| 3 | Sub-band | 8 antenna ports RI = 1 | NA | 9 + L | NA | NA |
| 4 | CQI/second | 8 antenna ports 1 < RI < 5 | NA | 10 + L | NA | NA |
| 5 | PMI | 8 antenna ports RI > 4 | NA | 8 + L | NA | NA |
| 6 | Wideband | 2 antenna ports RI = 1 | 7 | 7 | NA | NA |
| 7 | CQI/PMI | 4 antenna ports RI = 1 | 9 | 9 | NA | NA |
| 8 | | 2 antenna ports RI > 1 | 9 | 9 | NA | NA |
| 9 | | 4 antenna ports RI > 1 | 12 | 12 | NA | NA |
| 10 | Wideband | 8 antenna ports RI = 1 | 9 | 9 | NA | NA |
| 11 | CQI/second | 8 antenna ports 1 < RI < 4 | 12 | 12 | NA | NA |
| 12 | PMI | 8 antenna ports RI = 4 | 11 | 11 | NA | NA |
| 13 | | 8 antenna ports RI > 4 | 8 | 8 | NA | NA |
| 14 | Wideband | 8 antenna ports RI = 1 | 9 | NA | NA | NA |
| 15 | CQI/first | 8 antenna ports 1 < RI ≤ 4 | 12 | NA | NA | NA |
| 16 | PMI/second | 8 antenna ports 4 < RI ≤ 7 | 10 | NA | NA | NA |
| 17 | PMI | 8 antenna ports RI = 8 | 8 | NA | NA | NA |
| 18 | Wideband CQI | RI = 1 or RI > 1 | NA | NA | 5 | 5 |

Table 7 lists the maximum numbers of bits that can be transmitted on PUCCH according to the PUCCH transmission mode state when the eNB uses the extended cyclic prefix and the UE uses the 5-bit CQI table.

Using the index 7 in Table 7, the UE can send the eNB the 7-bit information including a 5-bit CQI value and a 2-bit PMI value. As described above, the LTE system restricts the maximum number of bits which the UE can transmit on the PUCCH for the eNB using the extended cyclic prefix to 11 bits. Accordingly, in the PUCCH reporting modes indicated by indices 9, 11, and 15 in Table 7, it is impossible to switch to the 5-bit CQI table.

In the case of index 4, if L is equal to or greater than 2, it is impossible to switch to the 5-bit CQI table in the PUCCH transmission mode. Here, L denotes the sub-band index transmitted on a specific frequency band when the CQI value is transmitted to the eNB, and is determined depending on the system bandwidth. In Table 7, the Rank Indication (RI) denotes the RI value which the UE has reported most recently compared to the corresponding CQI/PMI transmission time point and a number of spatial layers which the UE can receive based on the channel status between the eNB and UE in the LTE system supporting multiple transmit and receive antennas, or a value used in reporting the rank to the eNB.

greater than 1, the eNB and the UE reference the 4-bit CQI table as provided in Tables 3, 4, and 5 or the 5-bit CQI table of the CQI definition method 2 or more-bit CQI table to support 256QAM.

Figure 20:
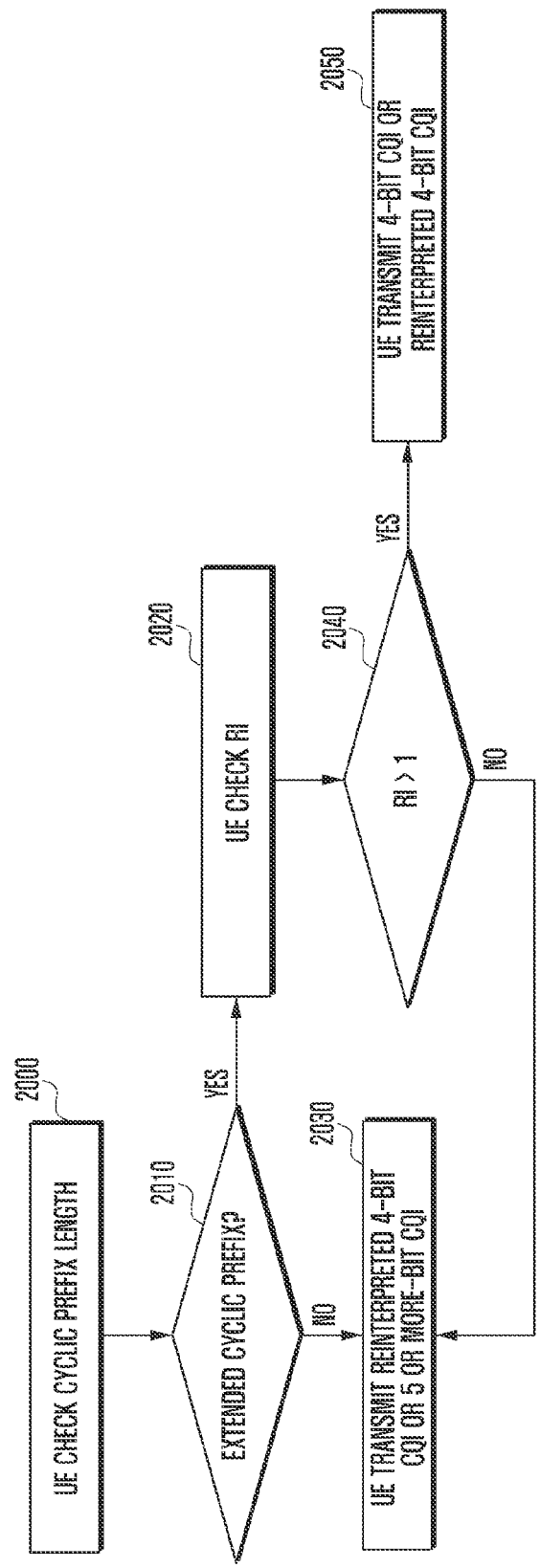
FIG. 20 is a flowchart illustrating the cyclic prefix length and Rank Indication (RI)-based CQI table switching method of the UE according to an embodiment of the present disclosure.

FIG. 20 is a flowchart illustrating the cyclic prefix length and RI-based CQI table switching method of the UE according to an embodiment of the present disclosure. Preferably, the RI value may be an RI which the UE has reported to the eNB most recently.

Referring to FIG. 20, the UE checks the length of the cyclic prefix of the eNB at operation 2000.

At operation 2010, the UE determines whether to switch the CQI table based on the cyclic prefix acquired at operation 2000.

If it is determined at operation 2010 that the cyclic prefix of the eNB is the normal cyclic prefix, the UE references the reinterpreted 4-bit CQI table provided in Tables 3, 4, and 5 to transmit a 4-bit CQI or references the 5-bit CQI table of the CQI switching method 2 or more-bit CQI table to transmit the CQI.

If it is determined at operation 2010 that the cyclic prefix of the eNB is the extended cyclic prefix, the UE checks the RI of the UE at operation 2020.

At operation 2040, the UE determines whether to perform CQI switching based on the RI checked at operation 2020.

If the RI is greater than 1 at operation 2040, the UE references the legacy 4-bit CQI table as in Table 2 or the reinterpreted 4-bit CQI table provided in Tables 3, 4, and 5 to transmit 4-bit CQI at operation 2050. Otherwise, if the RI is not greater than 1 at operation 2040, the UE references the reinterpreted 4-bit CQI table provided in Tables 3, 4, and 5 to transmit 4-bit CQI or references the 5-bit CQI table of the CQI switching method 2 or more-bit CQI table to transmit the CQI at operation 2030.

In this embodiment, the UE determines the CQI table based on the type of cyclic prefix and the RI value which it has reported and, in this case, the CQI table to be referenced is selected from among various tables including the CQI tables provided by the present disclosure.

The LTE system supports multiple transmit and receive antennas. The number of spatial layers or rank for transmitting signals through the multiple antennas varies depending on the channel status between the eNB and the UE. Accordingly, the UE must check the number of spatial layers or rank available for the channel status between the eNB and the UE and report the result to the eNB. In the LTE system, the UE is capable of reporting the number of spatial layers or rank using the RI. Typically, the high modulation order is advantageous to transmit more data but requires higher signal energy-to-noise plus interference ratio than that for a 64QAM or lower modulation scheme. Particularly, the 256QAM is capable of guaranteeing any satisfactory reception performance only with very high received signal energy-to-noise-plus-interference ratio. In the case of transmitting the signal modulated with 256QAM through multiple layers, the higher received signal energy-to-noise-plus-interference ratio is required to cancel the extra inter-layer interference. Since the transmission efficiencies of transmissions of the 256QAM signal on one layer and the 16QAM signal on two layers are identical with each other, the use of the 256QAM requiring very high received signal energy-to-noise-plus-interference ratio may be restricted depending on the RI value. Accordingly, the CQI table can be switched based on an RI value which the UE has reported to the eNB most recently.

CQI table switching method 5: switching based on an RI value which the UE has reported to eNB most recently The CQI table switching method 5 provided by an embodiment of the present disclosure is implemented in such a way of switching CQI tables based on the RI which the UE has transmitted to the eNB, and the RI may be an RI which the UE has reported to the eNB most recently.

In an embodiment, in the case that the eNB is capable of transmitting a 256QAM signal and the UE is capable of receiving the 256QAM signal, if the RI which the UE has reported to the eNB is greater than 1, the eNB and UE reference the CQI table as in Table 2 which does not support 256QAM or reference the reinterpreted 4-bit CQI table provided in Tables 3, 4, and 5 to support 256QAM without extra information. In the case that the eNB is capable of transmitting the 256QAM signal and the UE is capable of receiving the 256QAM signal, if the RI which the UE has reported to the eNB is not greater than 1, the UE and eNB reference the reinterpreted 4-bit CQI table provided in Tables 3, 4, and 5 to support 256QAM without extra information or reference the 5-bit CQI table such as the CQI definition method 2 or more-bit CQI table to support 256QAM.

Figure 21:
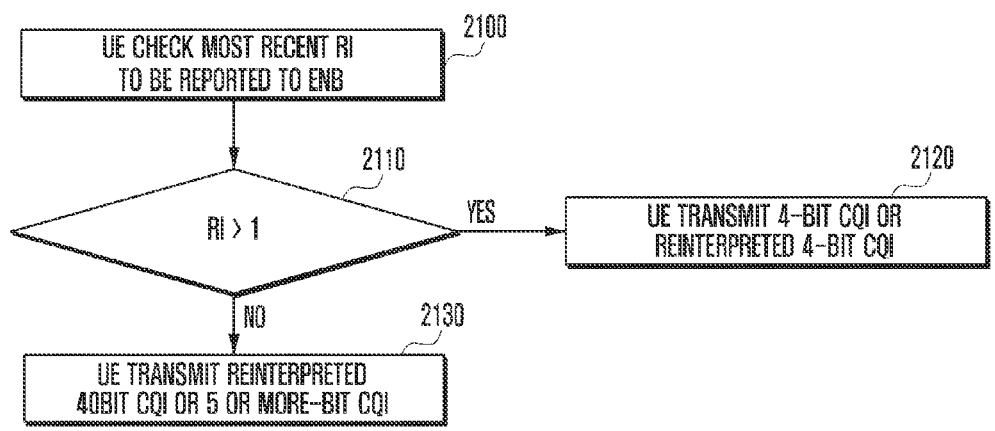
FIG. 21 is a flowchart illustrating the CQI table switching method of the UE based on RI which the UE has reported to the eNB most recently according to an embodiment of the present disclosure.

FIG. 21 is a flowchart illustrating the CQI table switching method of the UE based on an RI which the UE has reported to the eNB most recently according to an embodiment of the present disclosure. Although the description is directed to the case of using the RI which the UE has transmitted to the eNB most recently, the present disclosure is not restricted thereto.

Referring to FIG. 21, the UE measures the channel status and checks an RI to be reported to the eNB most recently at operation 2100.

At operation 2110, the UE determines whether to switch CQI tables based on the RI acquired at operation 2100.

If it is determined at operation 2110 that the RI acquired at operation 2100 is greater than 1, the UE references the legacy 4-bit CQI table as in Table 2 or the re-interpreted 4-bit table provided in Tables 3, 4, and 5 to transmit 4-bit CQI at operation 2120.

Otherwise, if it is determined at operation 2110 that the RI acquired at operation 2100 is not greater than 1, the UE references the 5-bit CQI table of the CQI switching method 2 or more-bit CQI table to transmit CQI at operation 2130.

In an embodiment, the UE determines the CQI table based on the RI which the UE has reported to the eNB and, in this case, the CQI table to be referenced is determined among various tables including the CQI table provided by the present disclosure.

In the Release 12 or higher LTE system, there are various types of eNBs and UEs such as eNBs and UEs having the LTE Release 11 and earlier features, eNBs and UEs supporting a plurality of transmit/receive antennas and 256QAM, and eNBs and UEs supporting single transmit and receive antennas and 256QAM. Accordingly, the data communication may occur between the eNB supporting multiple transmit and receive antennas and 256QAM and the UE supporting single transmit and receive antennas and 256QAM, and between the eNB supporting single transmit and receive antennas and 256QAM and the UE supporting multiple transmit and receive antennas and 256QAM, and, at this time, if the number of spatial layers or rank is restricted to 1 and if the eNBs and UEs use 256QAM, higher transmission efficiency can be realized. Since the transmission efficiencies of transmissions of the 16QAM signal on two layers and the 256QAM signal on one layer are identical with each other, the use of the 256QAM requiring very high received signal energy-to-noise-plus-interference ratio may be restricted.

Accordingly, the CQI table switching may depend on the maximum number of layers supportable between the eNB and the UE.

CQI table switching method 6: switching based on a number of layers supportable between the eNB and the UE.

The CQI table switching method 6 provided by an embodiment of the present disclosure is implemented in such a way of switching CQI tables based on a maximum number of layers supportable between the eNB and the UE.

The maximum number of layers supportable between the eNB and the UE is determined as the minimum value between a number of antenna ports of the eNB and the maximum downlink MIMO capability determined by the UE capability. For example, if the UE uses the transmission mode 9 or higher, the maximum number of layers supportable between the eNB and the UE is determined as the minimum value between the number of antenna ports of the eNB and the maximum downlink MIMO capability determined by the UE capability. If the UE uses the transmission mode 8 or lower, the maximum number of layers supportable between the eNB and the UE is determined as the minimum value between the number of antenna ports of the eNB for transmitting CRS and the maximum downlink MIMO capability determined by the UE capability. Accordingly, in the case that the eNB is capable of transmitting a 256QAM signal and the UE is capable of receiving the 256QAM signal, if the maximum number of layers supportable between the eNB and the UE is 1, it is possible to support the 256QAM without extra information by referencing the 4-bit CQI table provided in Tables 3, 4, and 5 or the 5-bit CQI table of the CQI definition method 2 or more-bit CQI table. In the case that the eNB is capable of transmitting the 256QAM signal and the UE is capable of receiving the 256QAM signal, if the maximum number of layers supportable between the eNB and the UE is greater than 1, it is possible to block the 256QAM by using the CQI table as in Table 2 or support 256QAM without extra information amount by referencing the 4-bit CQI table provided in Tables 3, 4, and 5 or the 5-bit CQI table of the CQI definition method or more-bit CQI table.

Figure 22:
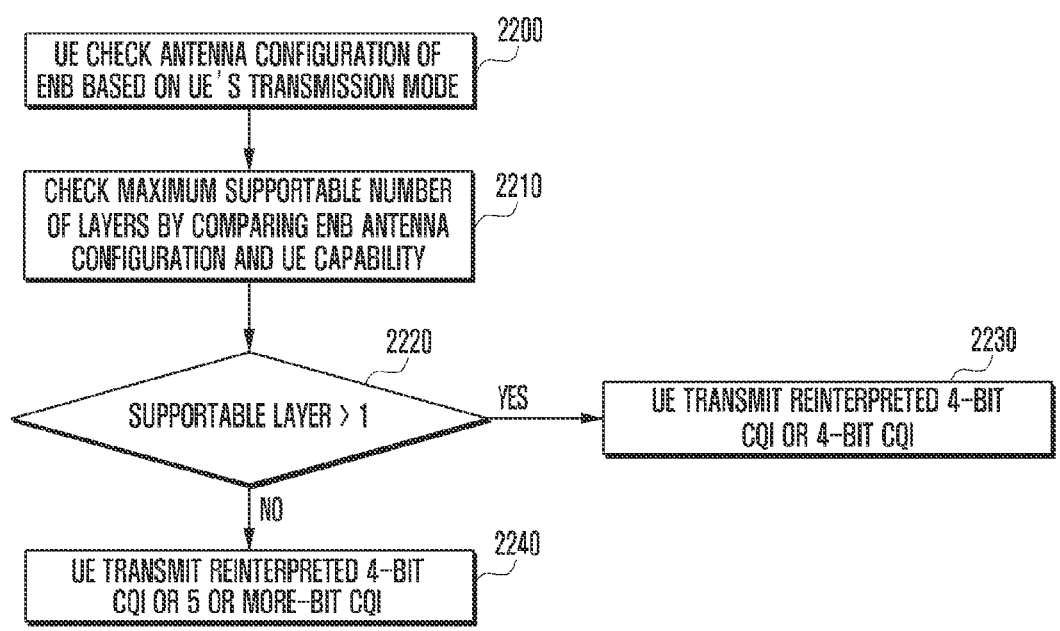
FIG. 22 is a flowchart illustrating the CQI table switching method of the UE based on maximum number of layers supportable between eNB and UE according to an embodiment of the present disclosure.

FIG. 22 is a flowchart illustrating the CQI table switching method of the UE based on a maximum number of layers supportable between eNB and UE according to an embodiment of the present disclosure.

Referring to FIG. 22, the UE checks the number of antenna ports of the eNB according to its transmission mode at operation 2200. For example, if the UE operates in the transmission mode 9 or higher, it is possible to check the antenna configuration of the eNB based on the number of antenna ports transmitting CSI-RS. If the UE operates in a transmission mode lower than transmission mode 9, it is possible to check the antenna configuration of the eNB based on the number of antennas transmitting CRS.

At operation 2210, the UE checks the number of layers based on the eNB antenna configuration checked at operation 2200 and UE capability. In more detail the eNB determines the number of layers supportable between the eNB and the UE as the minimum value between the number of antenna ports of the eNB and the maximum downlink MIMO capability in the UE capability.

At operation 2220, the UE determines whether to switch CQI tables based on the maximum number of layers supportable between the eNB and the UE which has been acquired at operation 2210.

If the number of layers supportable between the eNB and the UE which has been acquired at operation 2210 is determined at operation 2220 to be greater than 1, the UE references the legacy 4-bit CQI table as in/table 2 to transmit the 4-bit CQI or references the 4-bit CQI tables provided in Tables 3, 4, and 5 to support 256QAM without extra information or the 5-bit CQI table of CQI definition method 2 or more-bit CQI table to support 256QAM, at operation 2230.

If the number of layers supportable between the eNB and the UE which has been acquired at operation is not determined to be greater than 1 at operation 2220, the UE references the 4-bit CQI table provided in Tables 3, 4, 5 of the CQI switching method 2 to support 256QAM without extra information or references the 5-bit CQI table or more-bit CQI tables to transmit the CQI, at operation 2240.

It is possible to determine the MCS notification method based on the maximum number of layers supportable between the eNB and the UE.

256QAM-supportable MCS notification method 3: notify of MCS based on a maximum number of layers supportable between the eNB and the UE.

The 256QAM-supportable MCS notification method 3 provided by an embodiment of the present disclosure is implemented in such a way of notifying of MCS based on the maximum number of layers supportable between the eNB and the UE. Like embodiment 4, the maximum number of layers supportable between the eNB and the UE is determined as a minimum value between the number of antenna ports of the eNB and a maximum downlink MIMO capability determined by the UE capability. Both the eNB and UE are capable of checking the maximum number of layers supportable therebetween. In the case that the eNB is capable of transmitting a 256QAM signal and the UE is capable of receiving the 256QAM signal, if the maximum number of layers supportable between the eNB and the UE is greater than 1, the eNB is capable of generating the MCS index by referencing the legacy MCS table as in Table 1.

At this time, since the UE knows that the maximum number of layers supportable between the eNB and the UE is greater than 1, the UE interprets the MCS index by referencing the legacy MCS table as in Table 1 or generates the MCS index based on the reinterpreted 5-bit MCS table supporting 256QAM provided in Table 6 or 6 or more-bit MCS table.

Otherwise, if the maximum number of layers supportable between the eNB and the UE is determined to not be greater than 1, the eNB generates the MCS index by referencing the reinterpreted 5-bit MCS table supporting 256QAM provided in Table 6 or by referencing the 6 or more-bit MCS table. At this time, since the UE knows that the maximum number of layers supportable between the eNB and the UE is not greater than 1, the UE interprets the MCS index by referencing the MCS table supporting 256QAM provided in Table 6 or by referencing the 6 or more-bit MCS table.

Figure 23:
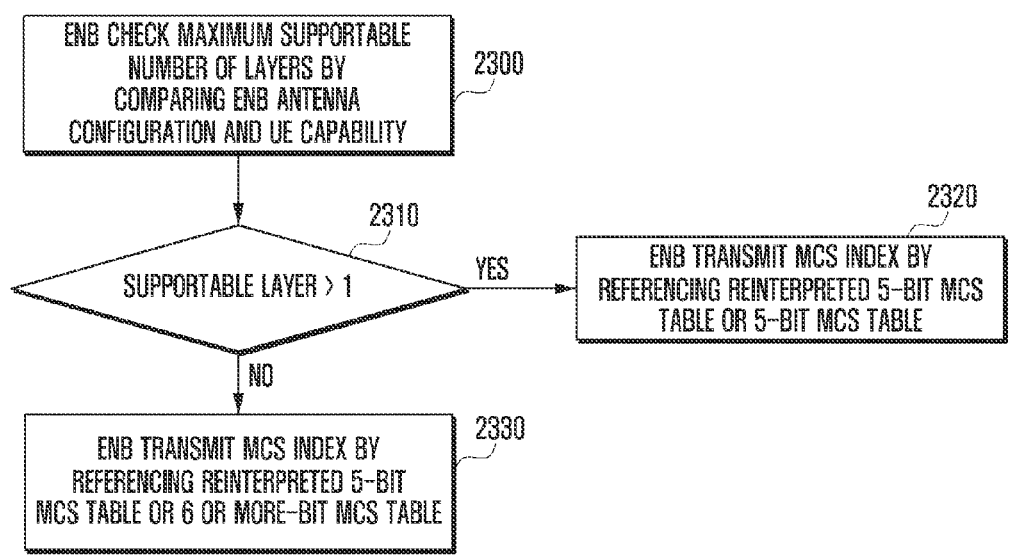
FIG. 23 is a flowchart illustrating the MCS notification method of the eNB based on the maximum number of layers supportable between eNB and UE according to an embodiment of the present disclosure.

FIG. 23 is a flowchart illustrating the MCS notification method of the eNB based on a maximum number of layers supportable between eNB and UE according to an embodiment of the present disclosure.

Referring to FIG. 23, the eNB is capable of checking a number of layers supportable between the eNB and the UE at operation 2300 and, in more detail, determining the number of layers supportable between the eNB and the UE as a minimum value between an antenna configuration of the eNB and a maximum downlink MIMO capability in the UE capability.

At operation 2310, the eNB determines the MCS notification method based on the maximum number of layers supportable between the eNB and the UE which has been acquired at operation 2300.

If the number of layers supportable between the eNB and the UE which has been checked at operation 2310 is determined at operation 2310 to be greater than 1, the eNB references the legacy 5-bit MCS table as in Table 1, the reinterpreted 5-bit MCS table supporting 256QAM provided in Table 6, or 6 or more-bit MCS table to transmit an MCS index to the UE at operation 2320.

If the number of layers supportable between the eNB and the UE which has been checked at operation 2310 is 1, the eNB references the reinterpreted 5-bit MCS table or 6 or more-bit MCS table to transmit MCS index to the UE at operation 2330. At this time, since the UE knows the maximum number of layers supportable between the eNB and the UE as determined at operations 2200 and 2210 of FIG. 22, it can interpret the MCS index by referencing the same MCS table as the eNB.

As described above, the 256QAM signal transmission/reception method and apparatus of the present disclosure are advantageous in transmitting a large amount of data at high speed with 256QAM. Also, the 256QAM signal transmission/reception method and apparatus are advantageous in compatibility with legacy mobile communication systems, and thus improve user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A signal transmission/reception method of a base station in a mobile communication system, the method comprising:
    receiving a first signal from a terminal;
    determining a modulation application criterion for data communication with the terminal based on the first signal;
    receiving a second signal including an index from the terminal; and
    determining a modulation scheme to be applied to at least one of the signals communicating with the terminal based on the modulation application criterion and the received index.

2. The method of claim 1, wherein the receiving of the first signal comprises receiving an indicator instructing the terminal to change the modulation application criterion, and the determining of the modulation scheme comprises changing the modulation application criterion according to the indicator.

3. The method of claim 1, wherein the receiving of the first signal comprises receiving the first signal which the terminal transmits through fallback transmission, and the determining of the modulation application criterion comprises determining, when the first signal is received according to the fallback transmission signal, the modulation application criterion according to the criterion corresponding to the fallback transmission signal.

4. The method of claim 1, wherein the receiving of the first signal comprises receiving the signal including at least one of an indicator of a rank measured by the terminal and an indicator of at least one supportable layer, and the determination of the modulation application criterion comprises determining the modulation application criterion based on at least one of the rank indicator and the supportable layer indicator.

5. The method of claim 1, wherein the determining of the modulation application criterion comprises determining one modulation application criterion of at least two modulation application criteria indicating different modulation orders in an index range of a same size based on the first signal.

6. A signal transmission/reception method of a terminal in a mobile communication system, the method comprising:
    transmitting a first signal to a base station; and
    transmitting a second signal including an index to the base station,
    wherein the base station determines a modulation application criterion for data communication with the terminal based on the first signal and selects a modulation scheme to be applied to at least one of the signals communicating with the terminal based on the modulation application criterion and the received index.

7. The method of claim 6, wherein the transmitting of the first signal comprises transmitting an indicator requesting the base station to change the modulation application criterion, and the base station changes the modulation application criterion according to the indicator.

8. The method of claim 6, wherein the transmitting of the first signal comprises transmitting the first signal through fallback transmission to the base station, and the base station determines, when the first signal is received through the fallback transmission signal, the modulation application criterion according to the criterion corresponding to the fallback transmission signal.

9. The method of claim 6, wherein the transmitting of the first signal comprises transmitting the signal including at least one of an indicator of a rank measured by the terminal and an indicator of at least one supportable layer, and the determination of the modulation application criterion comprises determining the modulation application criterion based on at least one of the rank indicator and the supportable layer indicator.

10. The method of claim 6, wherein the base station determines one modulation application criterion of at least two modulation application criteria indicating different modulation orders in an index range of a same size based on the first signal.

11. A base station of a mobile communication system, the base station comprising:
    a transceiver configured to transmit and receive signals to and from a terminal; and
    a controller configured to control the transceiver to receive a first signal from the terminal, to determine a modulation application criterion for data communication with the terminal based on the first signal, to control the transceiver to receive a second signal including an index from the terminal, and to determine a modulation scheme to be applied to at least one of the signals communicating with the terminal based on the modulation application criterion and the received index.

12. The base station of claim 11, wherein the controller controls receiving an indicator instructing the terminal to change the modulation application criterion and changing the modulation application criterion according to the indicator.

13. The base station of claim 11, wherein the controller controls receiving the first signal which the terminal transmits through fallback transmission and determines, when the first signal is received according to the fallback transmission signal, the modulation application criterion according to the criterion corresponding to the fallback transmission signal.

14. The base station of claim 11, wherein the controller controls receiving the signal including at least one of an indicator of a rank measured by the terminal and an indicator of at least one supportable layer and determines the modulation application criterion based on at least one of the rank indicator and the supportable layer indicator.

15. The base station of claim 11, wherein the controller determines one modulation application criterion of at least two modulation application criteria indicating different modulation orders in an index range of a same size based on the first signal.

16. A terminal of a mobile communication system, the terminal comprising:
    a transceiver configured to transmit and receive signals to and from a base station; and
    a controller configured to control the transceiver to transmit a first signal to a base station and to transmit a second signal including an index to the base station,
    wherein the base station determines a modulation application criterion for data communication with the terminal based on the first signal and selects a modulation scheme to be applied to at least one of the signals communicating with the terminal based on the modulation application criterion and the received index.

17. The terminal of claim 16, wherein the controller transmits an indicator requesting the base station to change the modulation application criterion, and the base station changes the modulation application criterion according to the indicator.

18. The terminal of claim 16, wherein the controller controls the transceiver to transmit the first signal through fallback transmission to the base station, and the base station determines, when the first signal is received through the fallback transmission signal, the modulation application criterion according to the criterion corresponding to the fallback transmission signal.

19. The terminal of claim 16, wherein the controller controls the transceiver to transmit the signal including at least one of an indicator of a rank measured by the terminal and an indicator of at least one supportable layer and determines the modulation application criterion based on at least one of the rank indicator and the supportable layer indicator.

20. The terminal of claim 16, wherein the base station determines one modulation application criterion of at least two modulation application criteria indicating different modulation orders in an index range of a same size based on the first signal.

* * * * *